(12) United States Patent
Jeong et al.

(10) Patent No.: US 11,098,947 B2
(45) Date of Patent: Aug. 24, 2021

(54) REFRIGERATOR AND MANUFACTURING METHOD THEREFOR

(71) Applicant: Samsung Electronics Co., Ltd, Suwon-si (KR)

(72) Inventors: Hyun Ku Jeong, Yongin-si (KR); Dae Hwan Kim, Seoul (KR); Hee Soo Jeong, Suwon-si (KR); Moon Il Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 15/769,701

(22) PCT Filed: Oct. 10, 2016

(86) PCT No.: PCT/KR2016/011307
§ 371 (c)(1),
(2) Date: Apr. 19, 2018

(87) PCT Pub. No.: WO2017/069439
PCT Pub. Date: Apr. 27, 2017

(65) Prior Publication Data
US 2018/0313598 A1    Nov. 1, 2018

(30) Foreign Application Priority Data

Oct. 19, 2015    (KR) .................. 10-2015-0145578

(51) Int. Cl.
*F25D 23/06* (2006.01)
*B32B 3/04* (2006.01)
(Continued)

(52) U.S. Cl.
CPC ............ *F25D 23/062* (2013.01); *B32B 3/04* (2013.01); *B32B 5/20* (2013.01); *B32B 7/12* (2013.01);
(Continued)

(58) Field of Classification Search
CPC .... F25D 23/062; F25D 23/006; F25D 23/066; F25D 2201/14; F25D 2201/10;
(Continued)

(56) References Cited

U.S. PATENT DOCUMENTS 3,167,159 A * 1/1965 Bovenkerk ............. F28F 13/00
52/404.1
3,370,740 A * 2/1968 Anderson ............. F25D 23/063
220/592.27
(Continued)

FOREIGN PATENT DOCUMENTS

CN        102575803 A    7/2012
CN        203949432 U    11/2014
(Continued)

OTHER PUBLICATIONS

Onishi, Koichi, Vacuum Heat Insulating Material Integrated With Outer Shell, Jun. 3, 1992, European Patent Office, English Translation (Year: 1992).*

(Continued)

*Primary Examiner* — Steve S Tanenbaum

(57) ABSTRACT

Disclosed is a refrigerator including an ultrathin wall-type insulating wall of which the thickness is made to be thin so as to increase the capacity of a storage chamber, while maintaining heat-insulating performance. A vacuum insulating material, provided inside the insulating wall, is provided so as to come into contact with an outer chamber such that the length between the outer chamber and an inner chamber is reduced. In addition, a foam material, which is formed by being foamed between the inner chamber and the outer chamber and is provided between the vacuum insulating material and the inner chamber, is formed to have a thin thickness so as to reduce the total thickness of the insulating wall, thereby increasing the capacity of the storage chamber (Continued)

and enabling the refrigerator to have a slim design so as to improve the aesthetics of the refrigerator.

12 Claims, 23 Drawing Sheets

(51) Int. Cl.
*B32B 5/20* (2006.01)
*B32B 7/12* (2006.01)
*F25D 23/00* (2006.01)

(52) U.S. Cl.
CPC .......... *F25D 23/006* (2013.01); *F25D 23/06* (2013.01); *F25D 23/063* (2013.01); *F25D 23/064* (2013.01); *F25D 23/066* (2013.01); *F25D 23/067* (2013.01); *B32B 2307/304* (2013.01); *B32B 2509/10* (2013.01); *F25D 2201/10* (2013.01); *F25D 2201/12* (2013.01); *F25D 2201/126* (2013.01); *F25D 2201/128* (2013.01); *F25D 2201/14* (2013.01)

(58) Field of Classification Search
CPC .......... F25D 2201/12; F25D 2201/128; F25D 23/063; F25D 23/064; F25D 23/067; F25D 23/06; B32B 3/04; B32B 5/20
USPC .......................................... 62/440
See application file for complete search history.

(56) References Cited

U.S. PATENT DOCUMENTS

| | | | | |
|---|---|---|---|---|
| 4,669,632 | A * | 6/1987 | Kawasaki | F16L 59/08 220/592.27 |
| 6,109,712 | A * | 8/2000 | Haworth | F24C 15/34 312/400 |
| 2007/0286981 | A1 * | 12/2007 | Feinerman | B32B 1/04 428/69 |
| 2012/0201997 | A1 * | 8/2012 | Fujimori | F16L 59/065 428/69 |
| 2012/0266962 | A1 * | 10/2012 | Wilson | F25D 23/064 137/1 |
| 2013/0149481 | A1 * | 6/2013 | Hiemeyer | B32B 27/12 428/47 |
| 2015/0192347 | A1 * | 7/2015 | Cho | F25D 21/04 62/272 |
| 2017/0023291 | A1 | 1/2017 | Kal et al. | |

FOREIGN PATENT DOCUMENTS

| | | | | |
|---|---|---|---|---|
| CN | 104975660 | A | 10/2015 | |
| CN | 104975660 | A * | 10/2015 | ............ E04B 1/803 |
| EP | 0658716 | A1 * | 6/1995 | ............ F16L 59/065 |
| EP | 2489920 | A1 | 8/2012 | |
| EP | 2940412 | A1 | 11/2015 | |
| EP | 2940412 | A1 * | 11/2015 | ............ F25D 23/067 |
| JP | 04160298 | A * | 6/1992 | |
| JP | H04160298 | A | 6/1992 | |
| JP | 2000320958 | A * | 11/2000 | |
| JP | 2004-012125 | A | 1/2004 | |
| JP | 2005-283059 | A | 10/2005 | |
| JP | 2012102894 | A | 5/2012 | |
| JP | 2013050268 | A | 3/2013 | |
| KR | 10-0790662 | B1 | 1/2008 | |
| KR | 10-2015-0010846 | A | 1/2015 | |
| KR | 10-2015-0106306 | A | 9/2015 | |
| WO | 2014103753 | A1 | 7/2014 | |
| WO | WO-2014103753 | A1 * | 7/2014 | ............ F25D 23/063 |

OTHER PUBLICATIONS

International Search Report dated Jan. 19, 2017 in connection with International Patent Application No. PCT/KR2016/011307.
Written Opinion of the International Searching Authority dated Jan. 19, 2017 in connection with International Patent Application No. PCT/KR2016/011307.
European Patent Office, "Supplementary European Search Report," Application No. EP 16857697.3, dated Sep. 12, 2018, 17 pages.
Office Action dated Dec. 17, 2019 in connection with Chinese Patent Application No. 201680060949.8, 24 pages.
Communication pursuant to Article 94(3) EPC dated Dec. 11, 2020 in connection with European Application No. 16857697.3, 7 pages.
Office Action dated Apr. 13, 2021 in connection with Chinese Patent Application No. 201680060949.8, 35 pages.

* cited by examiner

[Fig. 1]
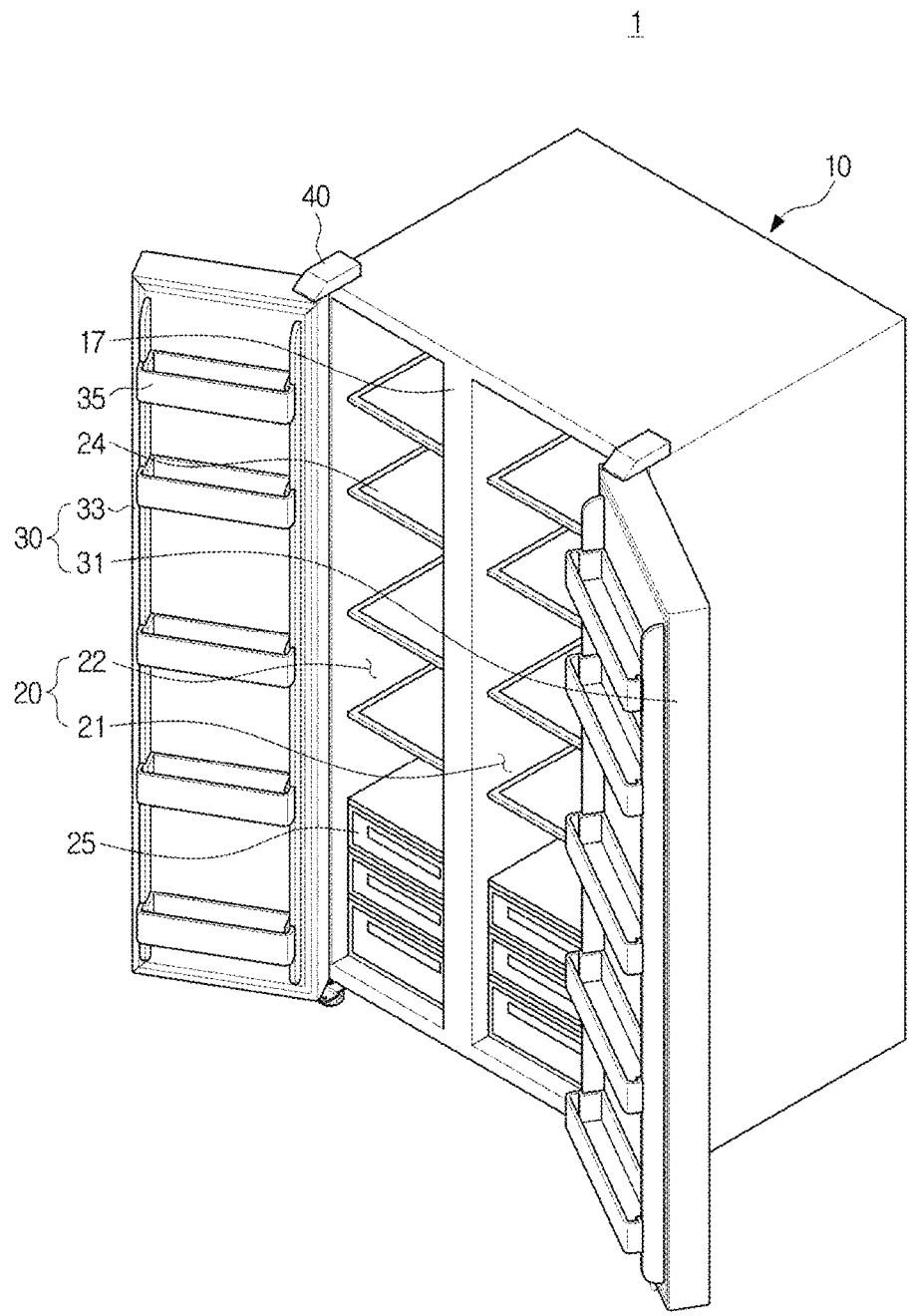

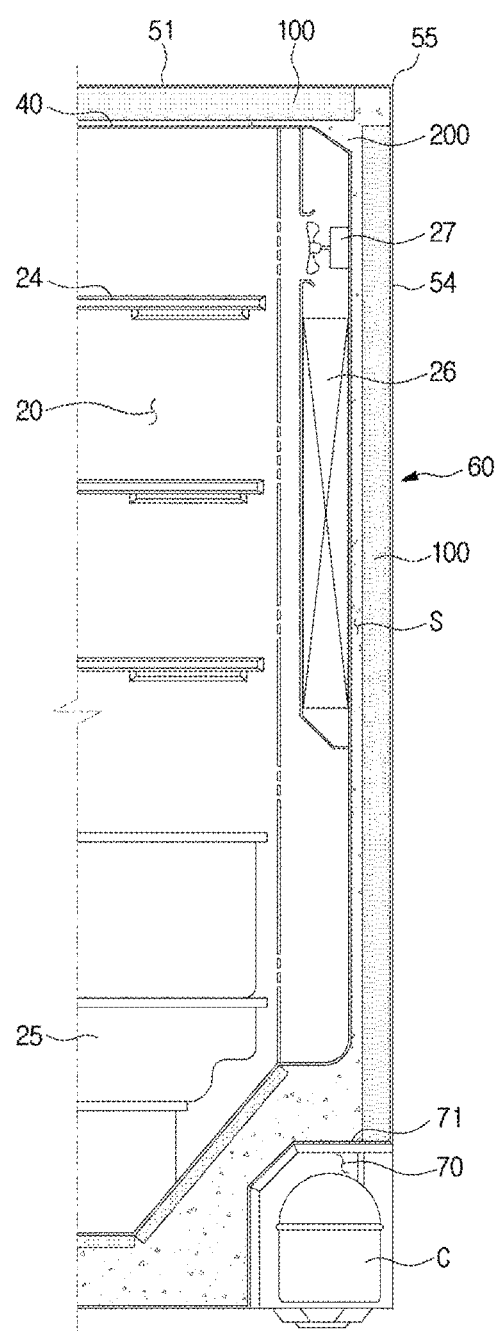
[Fig. 2]

[Fig. 3]
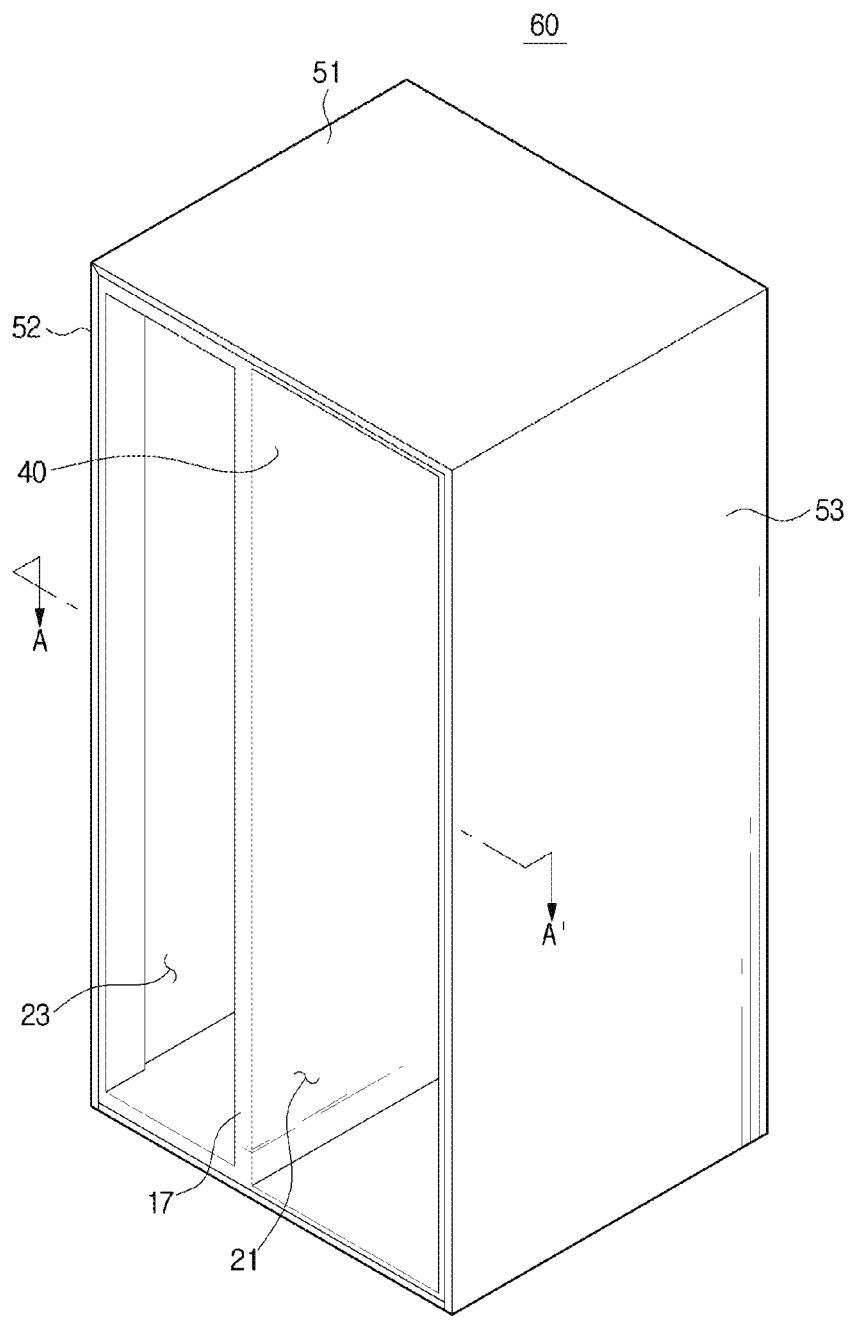

[Fig. 4]
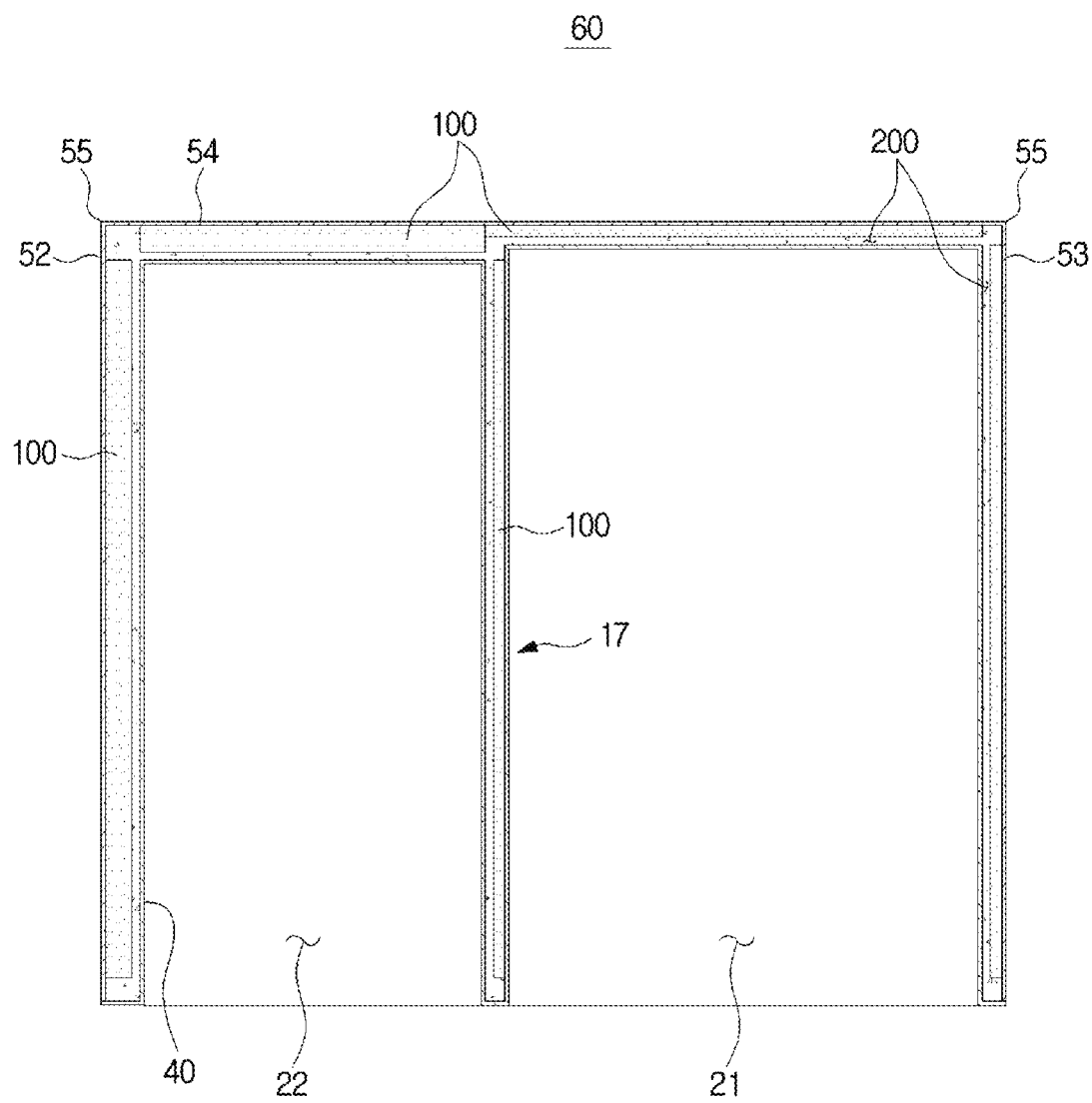

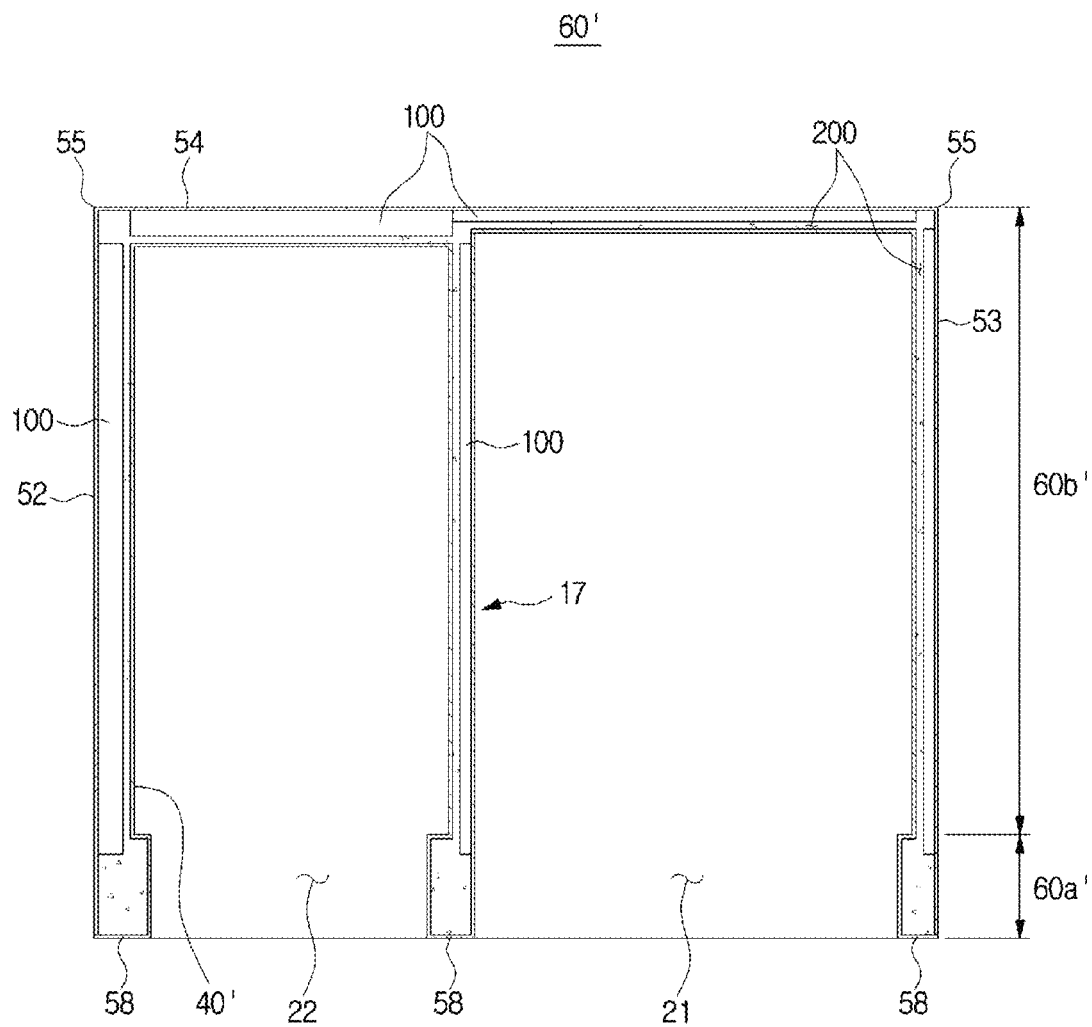
[Fig. 5]

[Fig. 6]
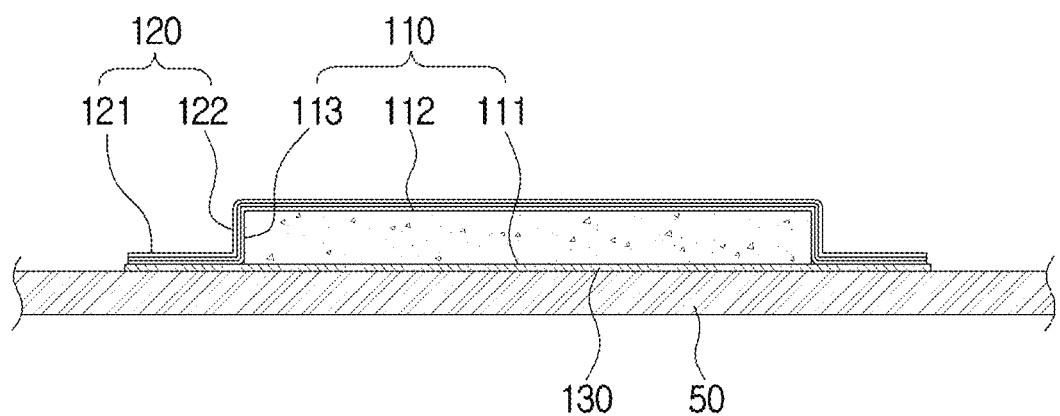

[Fig. 7]
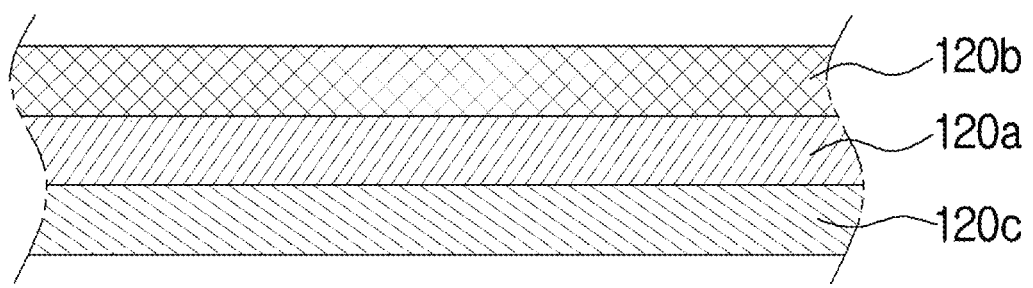

[Fig. 8]
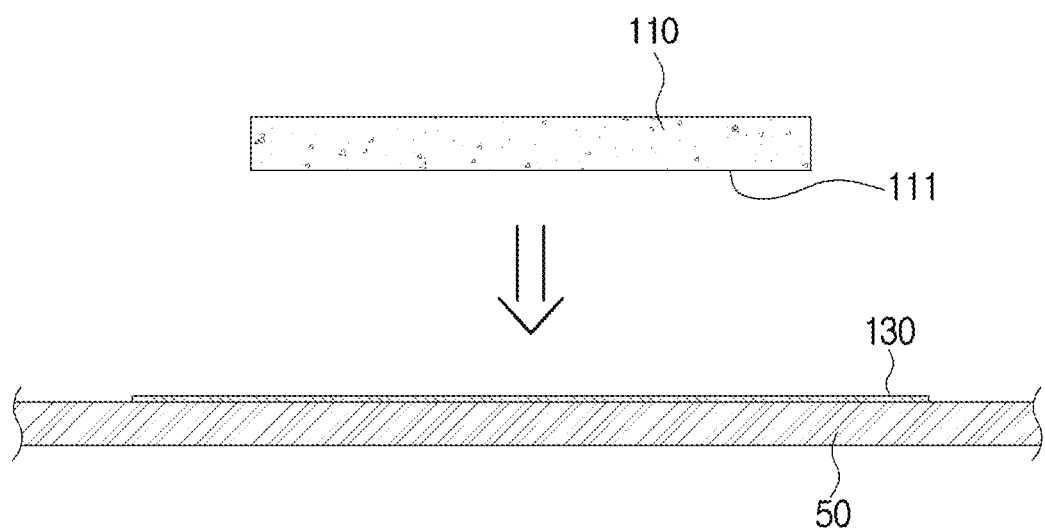

[Fig. 9]
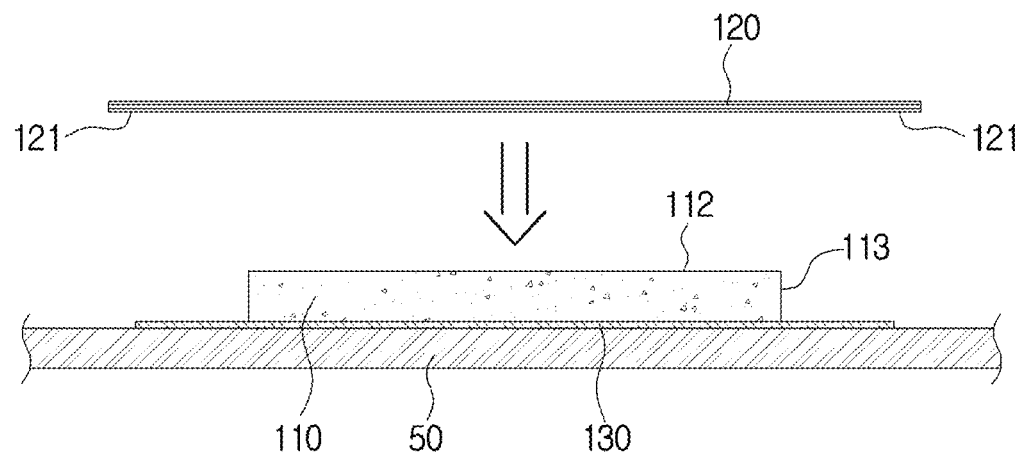

[Fig. 10]
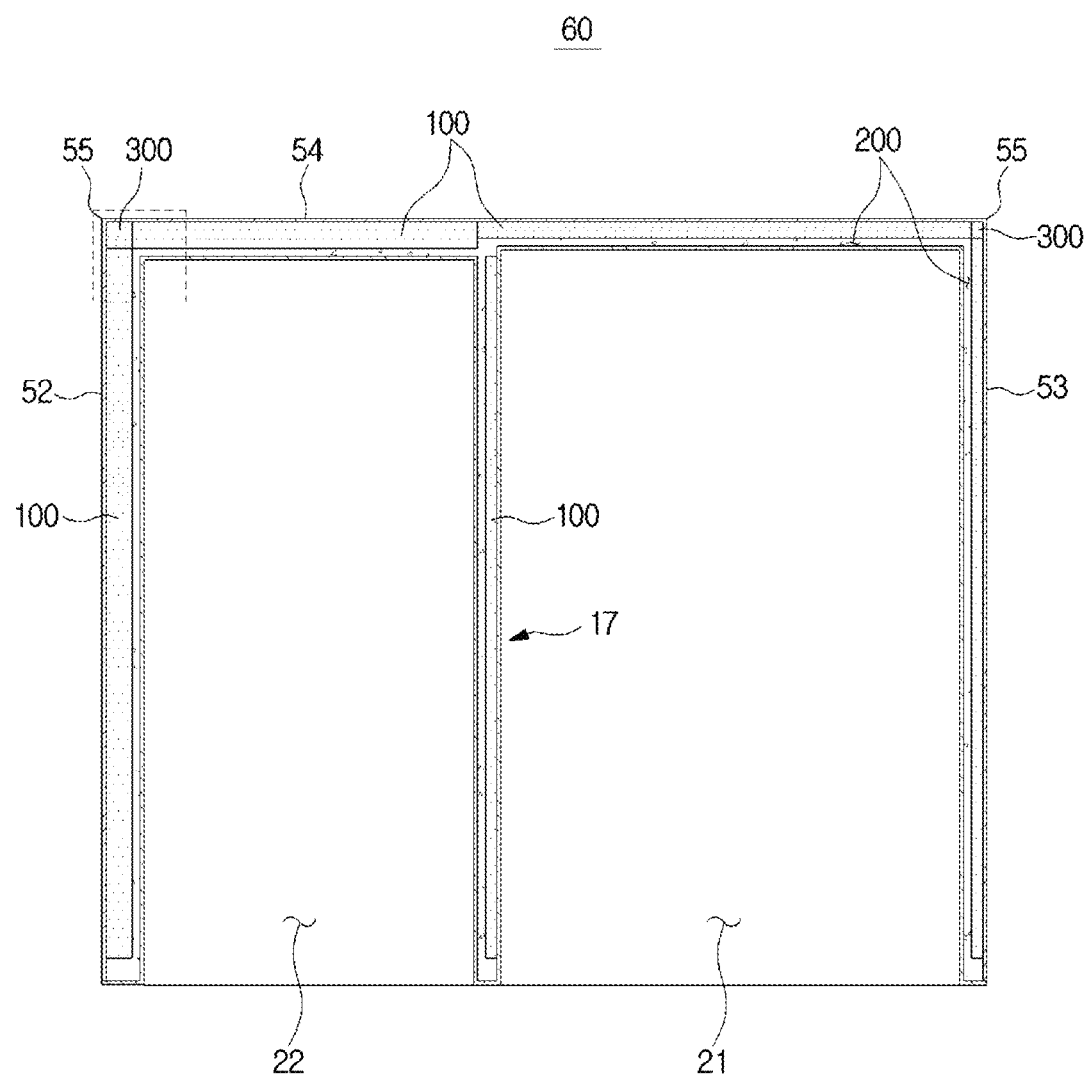

[Fig. 11]
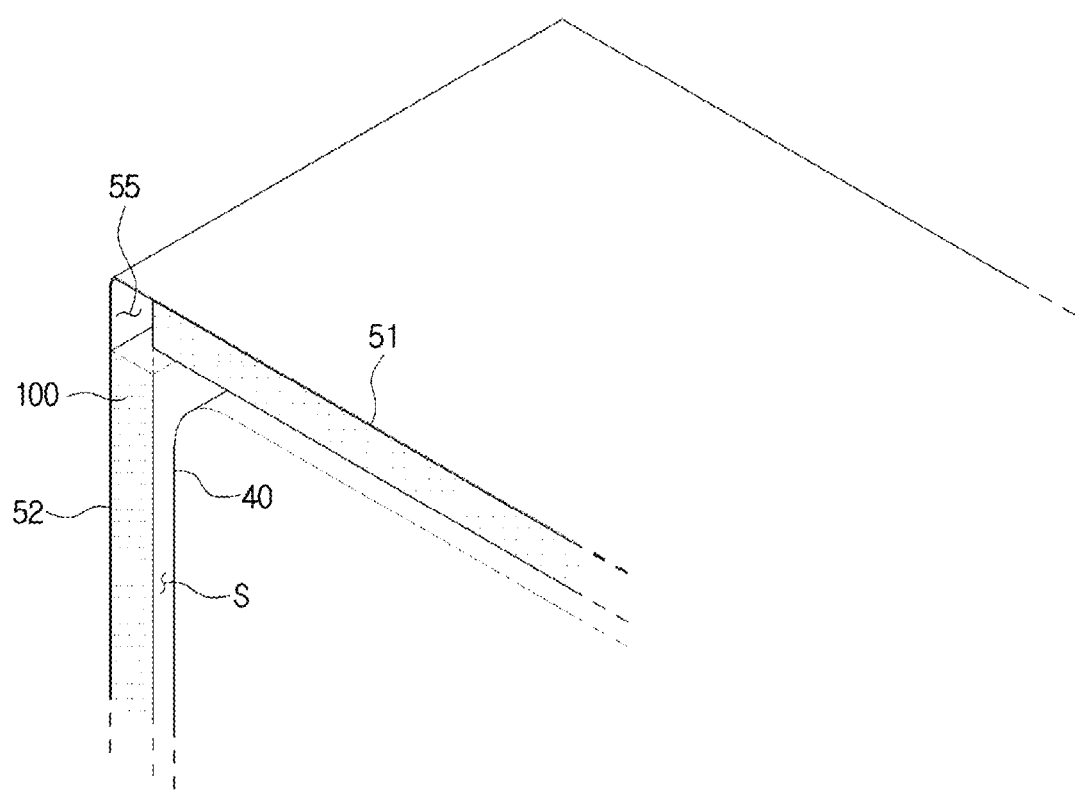

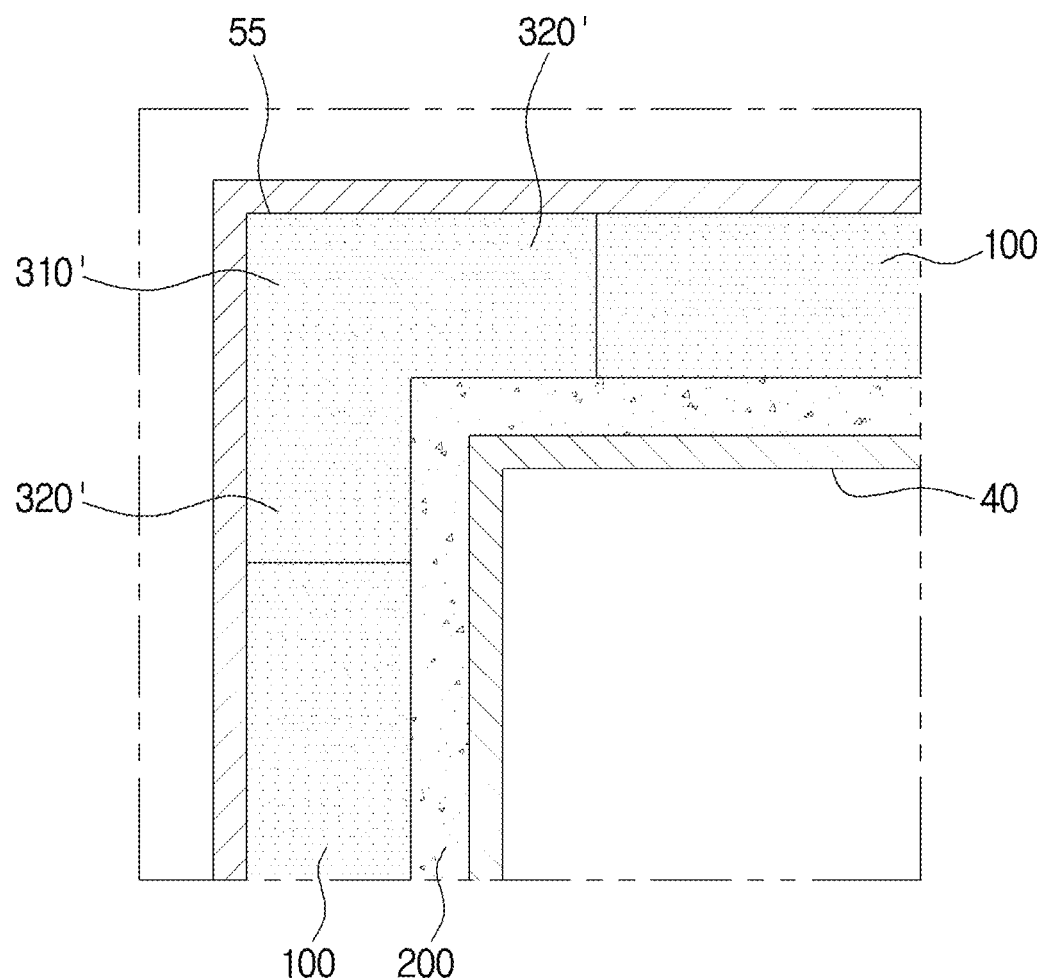
[Fig. 12]

[Fig. 13]
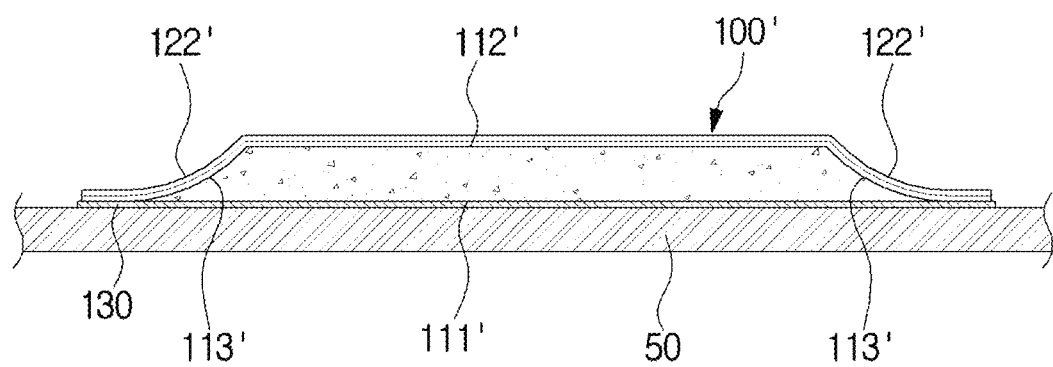

[Fig. 14]
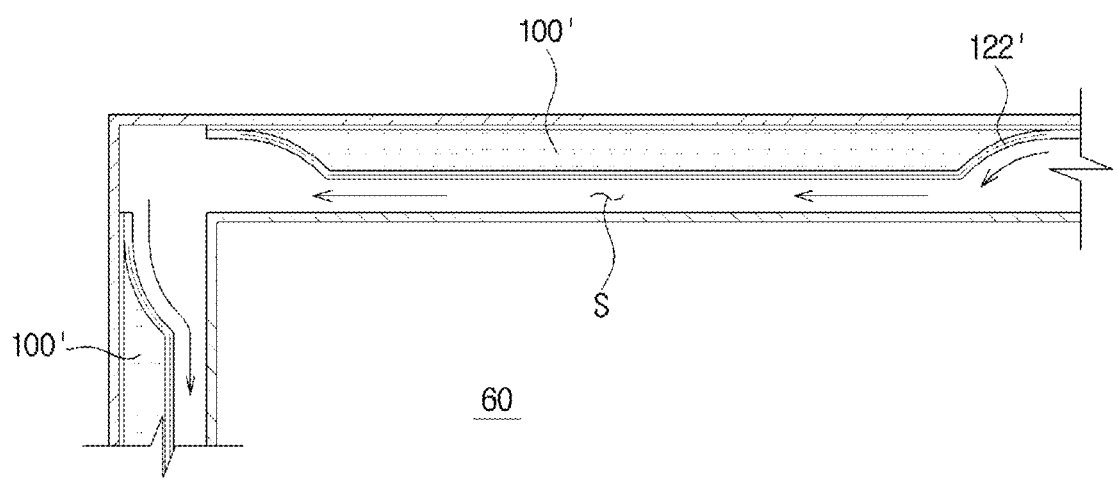

[Fig. 15]
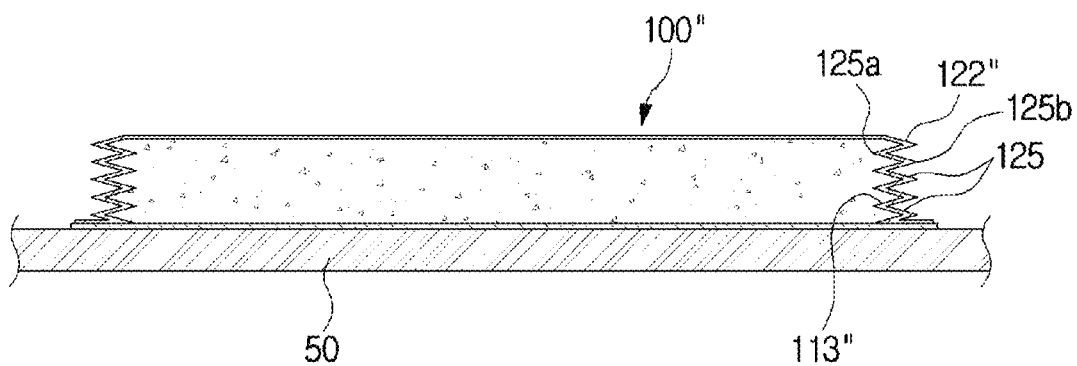

[Fig. 16]
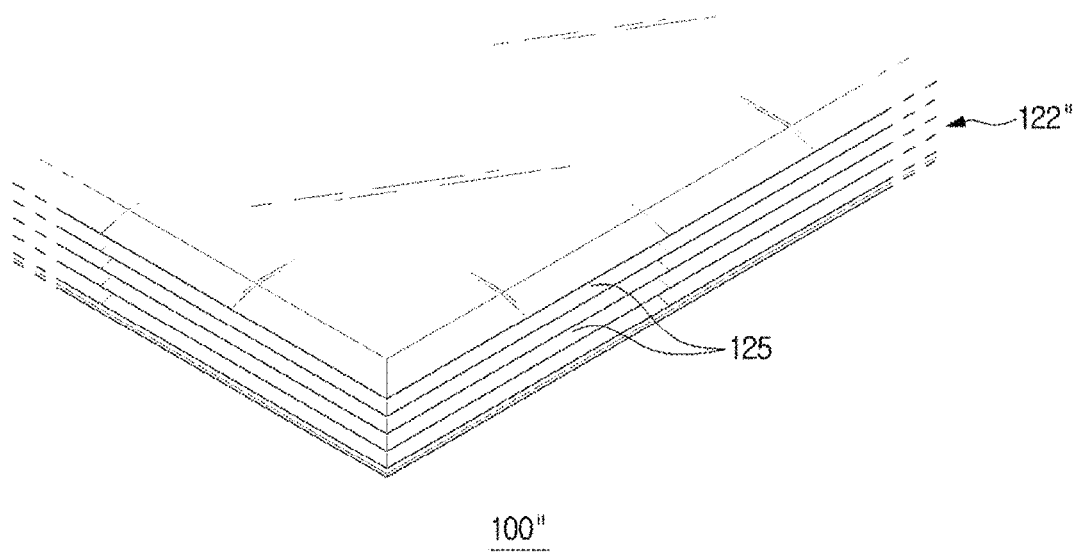

[Fig. 17]
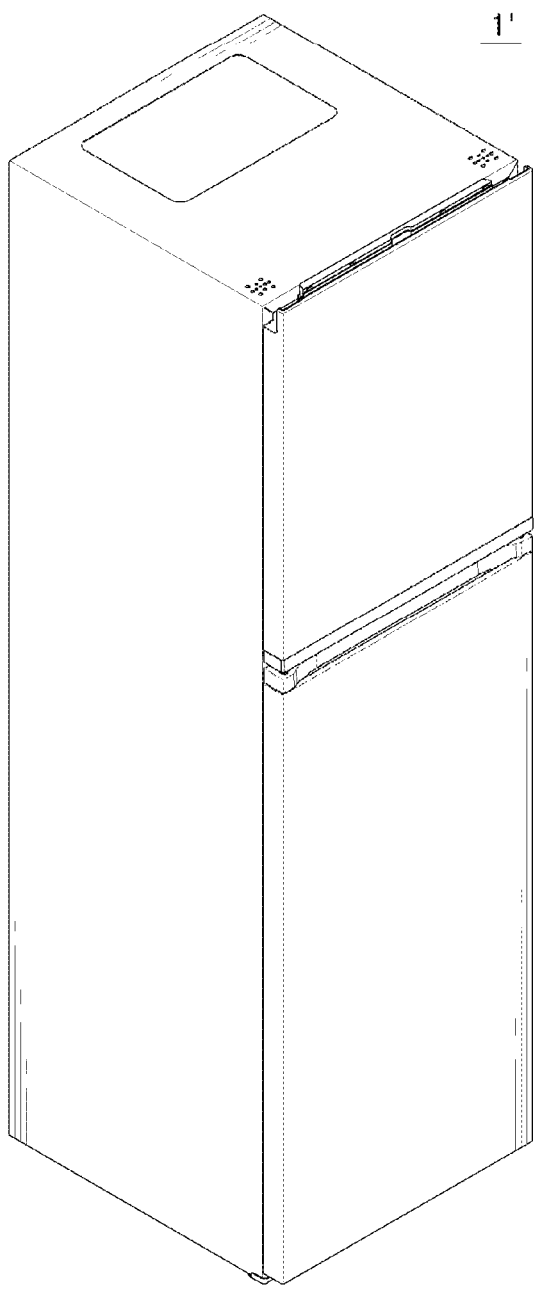

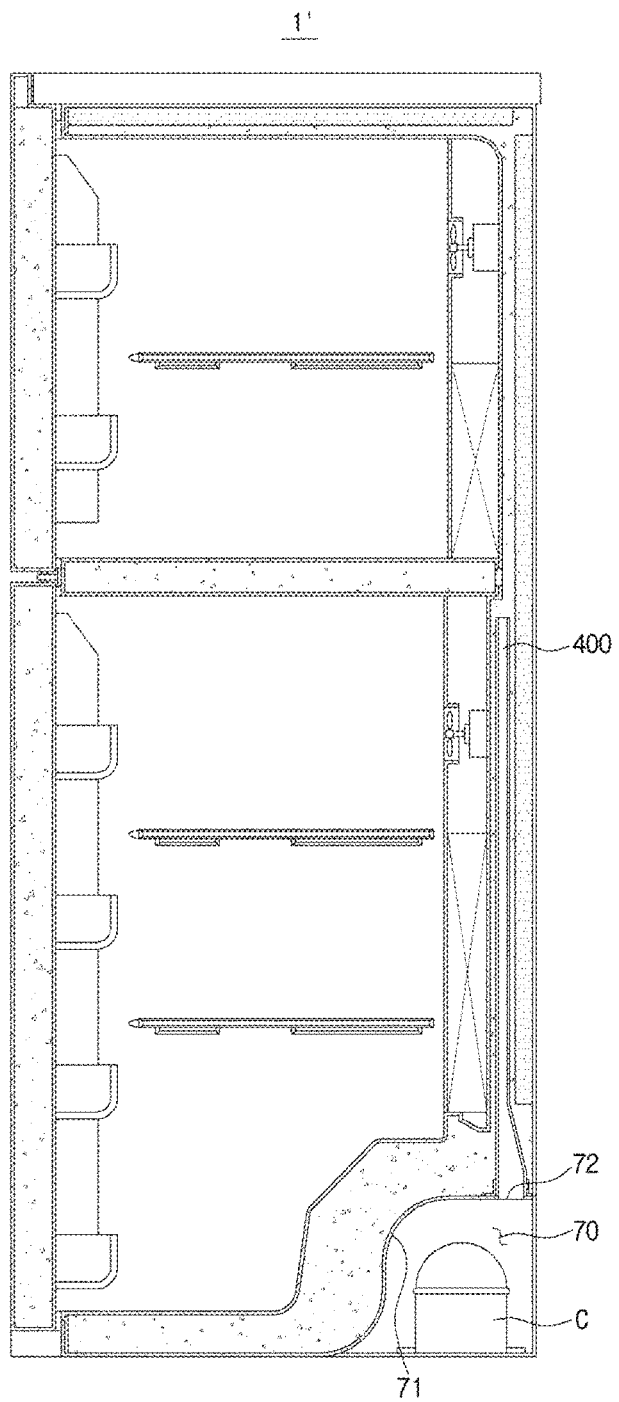
[Fig. 18]

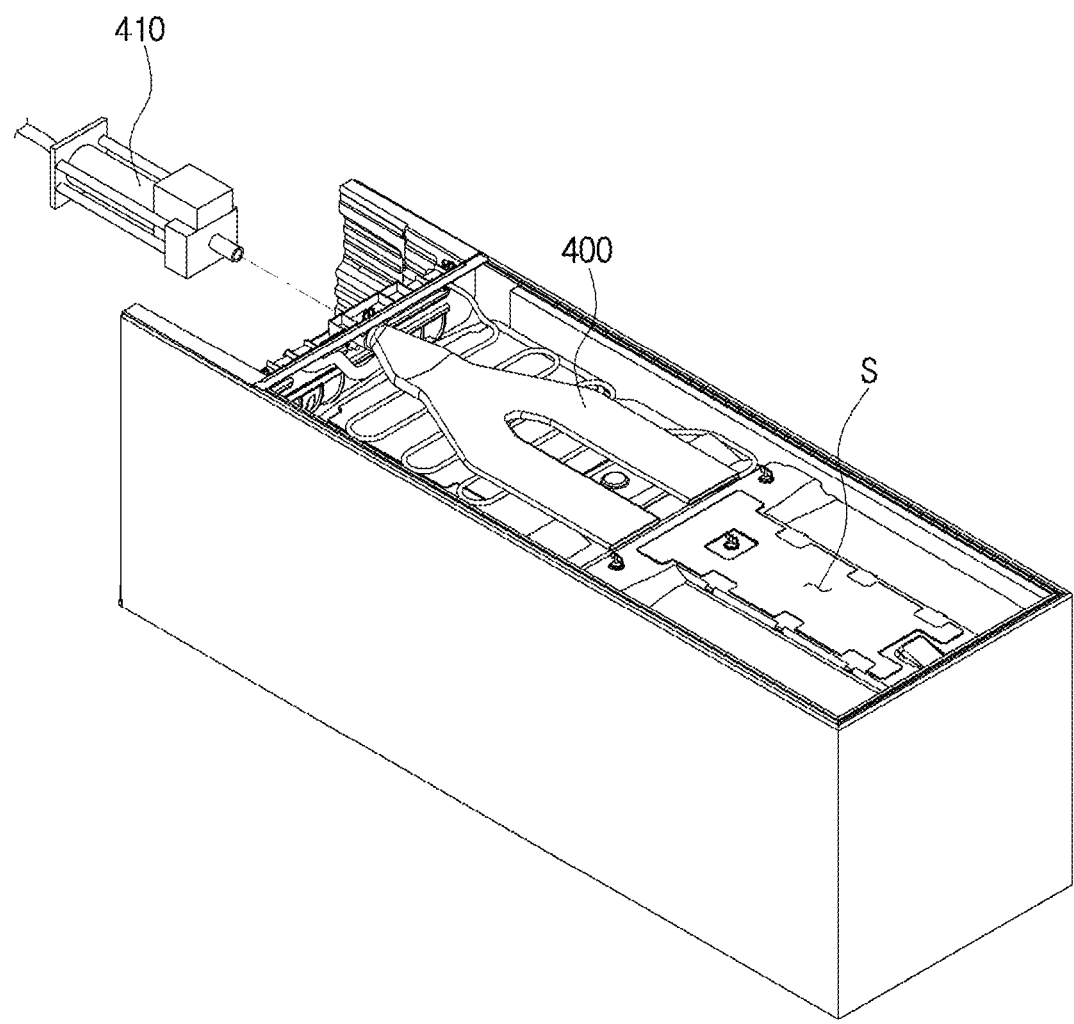
[Fig. 19]

[Fig. 20]
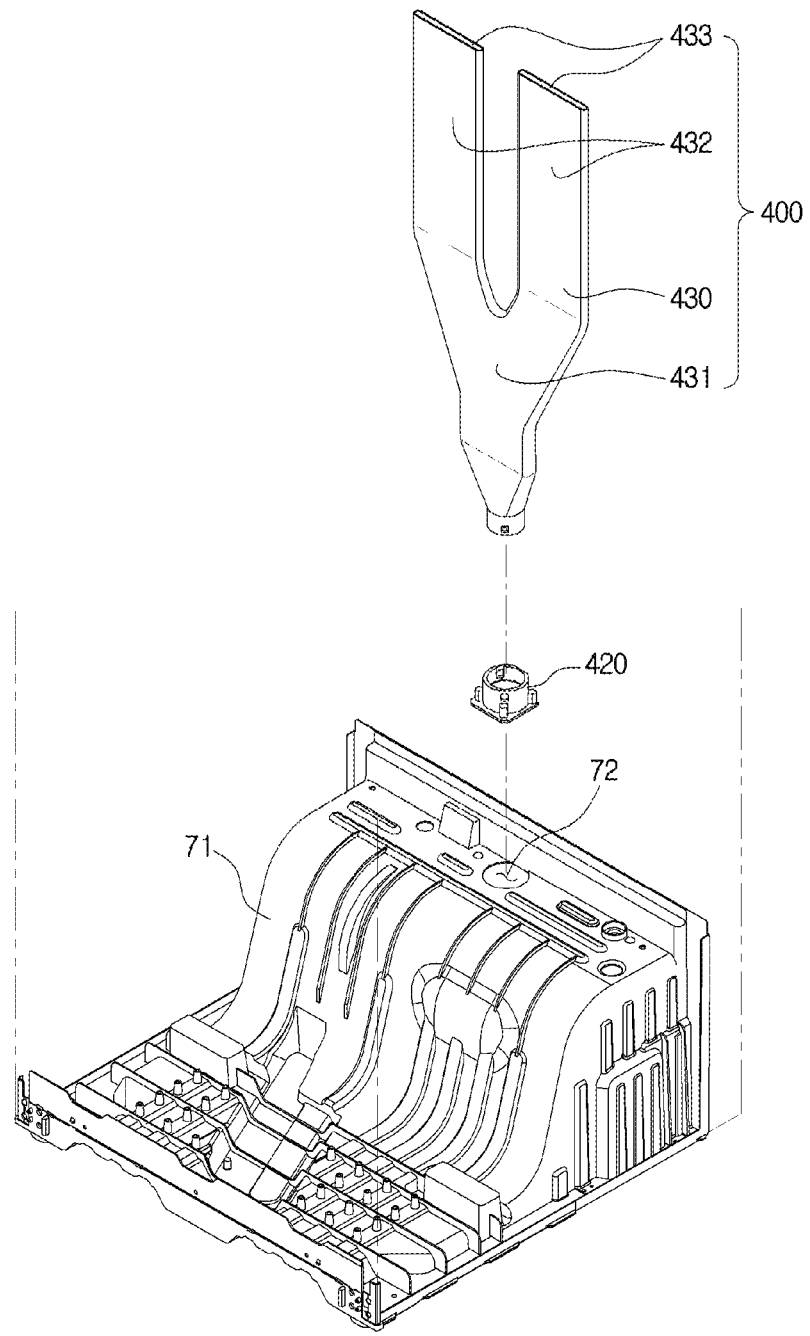

[Fig. 21]
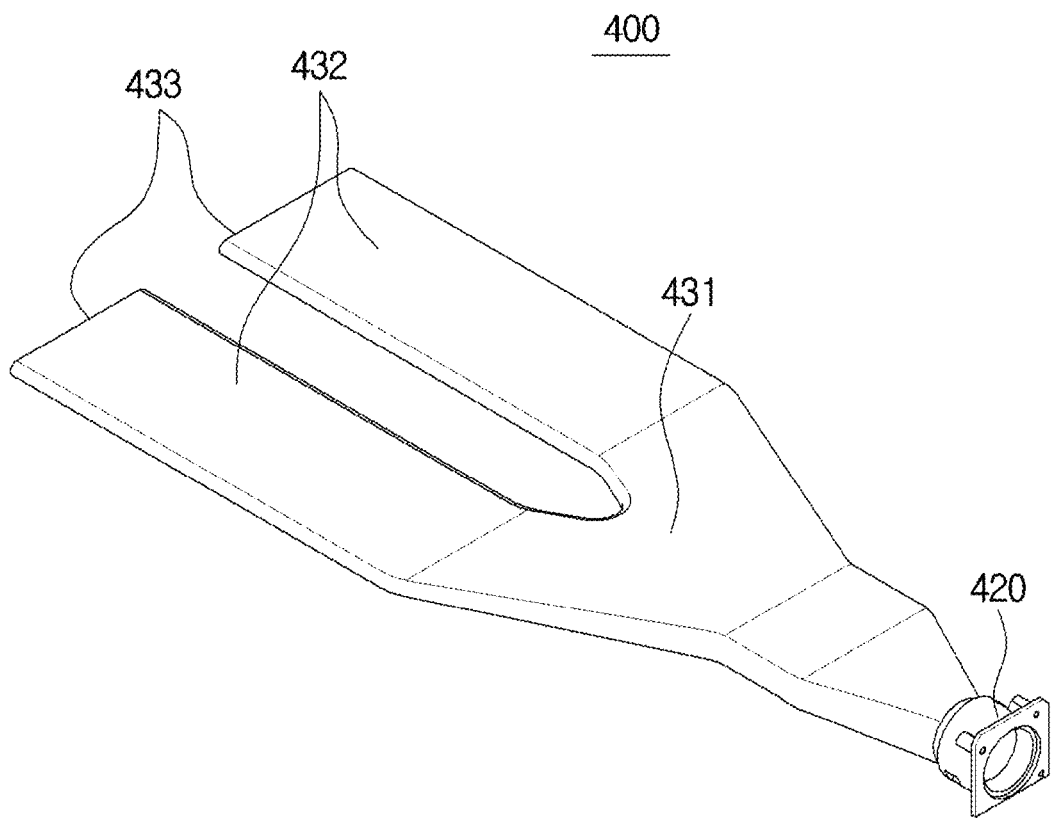

[Fig. 22]
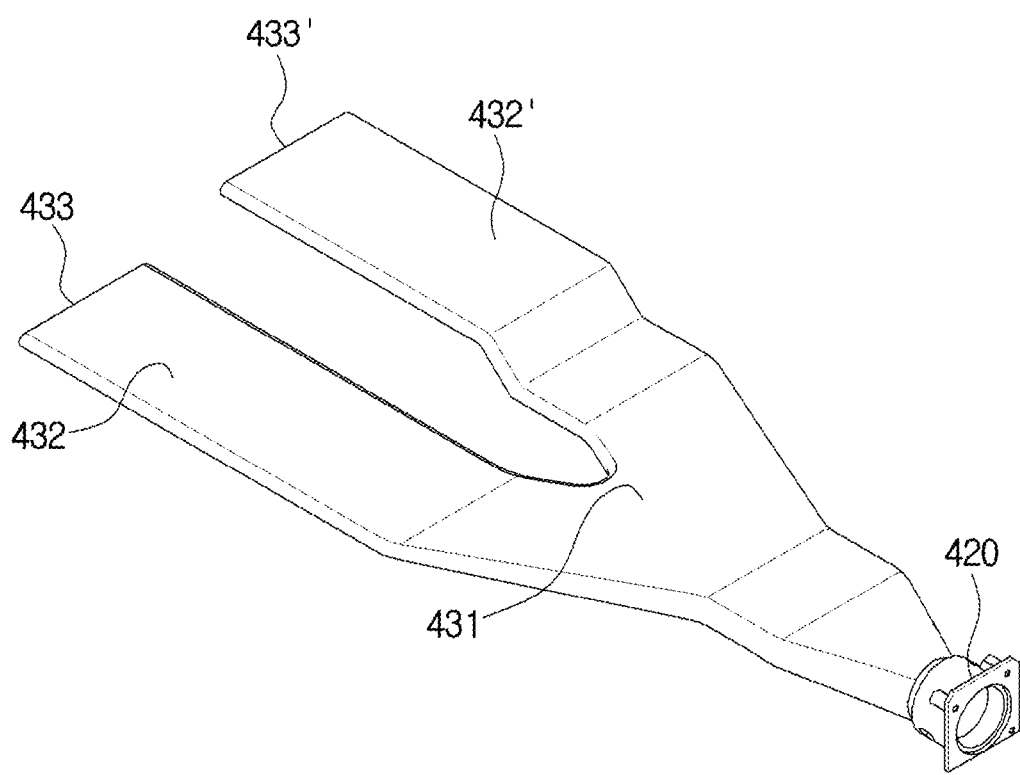

[Fig. 23]
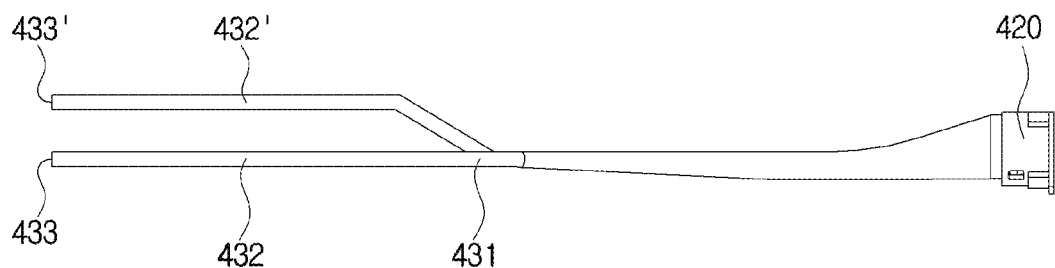

REFRIGERATOR AND MANUFACTURING METHOD THEREFOR

CROSS-REFERENCE TO RELATED APPLICATIONS AND CLAIM OF PRIORITY

The present application is a 371 of International Application No. PCT/KR2016/011307 filed on Oct. 10, 2016, which claims priority to Korean Patent Application No. 10-2015-0145578 filed on Oct. 19, 2015, the disclosures of which are herein incorporated by reference in their entirety.

TECHNICAL FIELD

The present invention relates to a vacuum insulation panel and a refrigerator including the same, and more particularly, to a refrigerator having an insulating wall including a vacuum insulation panel.

BACKGROUND

Energy consumed by humankind is limited, and global warming caused by carbon dioxide generated by using energy is the greatest problem humankind faces in regards to the energy crisis. Accordingly, energy regulations of each country have been tightened day by day, and an energy rating system for home appliances is a permanent problem that manufacturers have. An energy rating system of a government which requires maximum efficiency while efficiently using less energy accords with the needs of consumers who desire high internal capacity and low power consumption. Particularly, many studies on refrigerators have been performed for the past several decades, and studies for improving the efficiency of a cooling cycle, a compressor, a heat exchanger, and the like have reached their limit. Accordingly, recent studies on thermal loss are mainly performed, and many attempts to increase energy efficiency by strengthening insulation performance of refrigerators have been performed.

An insulating material such as an existing polyurethane has a heat conductivity of about 20 mk/m·K. When the insulating material is used, a thickness of an insulating wall of a refrigerator becomes greater such that storage capacity of the refrigerator is reduced. Accordingly, to solve these problems, it is necessary to use a vacuum insulation panel having excellent insulation performance.

According thereto, an insulating wall of a refrigerator may be formed using a vacuum insulation panel and a foam material including polyurethane. Here, an effective arrangement of the vacuum insulation panel and the foam material in the insulating wall is an issue for increasing a storage capacity of the refrigerator by simultaneously maintaining insulation performance and minimizing a thickness of the insulating wall.

SUMMARY

One aspect of the present invention provides a refrigerator including an inner casing, an outer casing which covers the inner casing, a vacuum insulation panel provided in a space between the inner casing and the outer casing and disposed on at least one surface of the outer casing, and a foam material formed by foaming in the space between the inner casing and the outer casing. Here, the vacuum insulation panel includes a core material which includes a first surface attached to the at least one surface of the outer casing, and an envelope material which surrounds a second surface provided opposite the first surface and side surfaces to cover the core material. Also, the foam material foams in the space between the vacuum insulation panel and the inner casing to have a thickness of 5 mm to 10 mm.

An adhesive layer may be provided between the at least one surface of the outer casing and the first surface of the core material, and the core material may come into contact with the at least one surface of the outer casing through the adhesive layer.

The core material may come into direct contact with the at least one surface of the outer casing without a medium.

A peripheral portion of the envelope material, which surrounds all of the second surface and the side surfaces of the core material and is disposed outside the core material, may be attached to the adhesive layer.

The envelope material and the adhesive layer may include identical materials to be heat-welded while the envelope material is attached to the adhesive layer.

The peripheral portion of the envelope material, which surrounds all of the second surface of the core material and the side surfaces to cover the core material and is disposed outside the core material, may be attached to the at least one surface of the outer casing.

The vacuum insulation panel may be disposed in an order of the adhesive layer, the core material, and the envelope material from the outer casing.

The envelope material may be provided to have a round-shaped area which covers the side surfaces of the core material from the peripheral portion of the envelope material.

A plurality of wrinkles introduced inward from the envelope material may be provided in the round-shaped area which covers the side surfaces of the core material from the peripheral portion of the envelope material.

The side surfaces of the core material may include a plurality of wrinkles introduced inward from the core material, and the plurality of wrinkles provided at the envelope material may be provided in a shape corresponding to the plurality of wrinkles provided at the side surfaces.

A plurality of such vacuum insulation panels may be provided and disposed on a plurality of surfaces which form the outer casing, and an auxiliary vacuum insulation panel may be provided at a corner formed between the plurality of surfaces of the outer casing.

The auxiliary vacuum insulation panel may be provided in a gap space formed between the plurality of vacuum insulation panels.

In an area in which the vacuum insulation panel is disposed, the vacuum insulation panel, the foam material, and the inner casing may be sequentially arranged from the outer casing in an inward direction.

The refrigerator may further include a machine compartment which accommodates a compressor, a machine compartment cover which covers the machine compartment and includes a foam solution inlet for allowing a foam solution which forms the foam material to foam in the space between the inner casing and the outer casing, and a foam solution guide connected to the foam solution inlet to guide the foam solution to the space between the inner casing and the outer casing. Here, the foam solution guide may extend an initial discharge position of the foam solution by a length of the foam solution guide to an inside of the space between the inner casing and the outer casing.

One end of the foam solution guide may communicate with the foam solution inlet, and the other end of the foam solution guide may include a foam solution outlet through which the foam solution is discharged. Also, a plurality of such foam solution outlets may be provided as the foam solution guide diverges in a longitudinal direction.

The foam solution outlet may be located between the inner casing and the vacuum insulation panel.

The plurality of outlets may be provided at different positions in a direction between the outer casing and the inner casing.

The foam solution guide may be provided in a Y shape to allow the foam solution to foam into the space between the outer casing and the inner casing in two ways.

Another aspect of the present invention provides a refrigerator including an inner casing, an outer casing which covers the inner casing, and an insulating wall formed of at least one of the inner casing and the outer casing. Here, the insulating wall includes a vacuum insulation panel provided in the insulating wall and disposed on at least one surface of the outer casing, and a foaming material formed by foaming between the inner casing and the outer casing. Here, the vacuum insulation panel includes a wrinkle area configured to include wrinkles formed at certain intervals on a side surface which extends between one surface of the vacuum insulation panel attached to the outer casing and the other surface provided opposite thereto. Also, the foaming material foams between the vacuum insulation panel and the inner casing.

A wrinkle area may allow the foam solution to smoothly flow when the foam solution foams in the insulating wall to form the foam material.

The vacuum insulation panel may include a core material which includes one side attached to the at least one surface of the outer casing and an envelope material which surrounds the other side of the core material to cover the core material.

The wrinkle area may be provided at the envelope material, and may include a plurality of valleys inwardly concave from the envelope material and a plurality of ridges outwardly convex from the envelope material.

The plurality of valleys and the plurality of ridges may be disposed at uniform intervals.

An adhesive layer may be provided between the at least one surface of the outer casing and one side of the core material, and the core material may come into contact with the at least one surface of the outer casing through the adhesive layer.

A peripheral portion of the envelope material, which surrounds the entire other side of the core material and is disposed outside the core material, may be attached to the adhesive layer.

The envelope material and the adhesive layer may include identical materials to be heat-welded while the envelope material is attached to the adhesive layer.

The peripheral portion of the envelope material, which surrounds the other side of the core material to cover the core material and is disposed outside the core material, may be attached to the at least one surface of the outer casing.

The vacuum insulation panel may be disposed in an order of the adhesive layer, the core material, and the envelope material from the outer casing.

The vacuum insulation panel may include one side in contact with the at least one surface of the outer casing, and the at least one surface of the outer casing and the one side of the vacuum insulation panel may be adhered to each other by an adhesive.

When the insulating wall is provided between inner casings, the vacuum insulation panel may be disposed and attached to one surface of any one of the inner casings facing the other inner casing.

Still another aspect of the present invention provides a refrigerator including an inner casing, an outer casing which covers the inner casing, and an insulating wall formed of at least one of the inner casing and the outer casing. Here, the insulating wall includes a vacuum insulation panel provided in the insulating wall and disposed on the at least one surface of the outer casing, a foam material formed by a foam solution in a space between the inner casing and the outer casing and formed to have a thickness of 5 mm to 10 mm between the inner casing and the vacuum insulation panel, and a foam solution guide which extends into a space between the vacuum insulation panel and the inner casing to guide the foam solution to form the foam material having the thickness. Also, the foam solution guide includes a plurality of foam solution outlets through which the foam solution is discharged.

The foam solution guide may extend an initial discharge position of the foam solution by a length of the foam solution guide into an inside of the space between the inner casing and the outer casing.

The foam solution guide may include a foam solution outlet through which the foam solution is discharged, and a plurality of such foam solution outlets may be provided as the foam solution guide diverges at one place on the foam solution guide.

The plurality of outlets are provided at different positions in an extension direction of the foam solution guide and a horizontal direction.

The plurality of outlets may be provided at different positions in a direction between the outer casing and the inner casing.

The refrigerator may further include a machine compartment which accommodates a compressor and a machine compartment cover which covers the machine compartment and includes a foam solution inlet for allowing the foam solution to foam. Here, the foam solution guide may be connected to the foam solution inlet, and may guide the foam solution to the space between the inner casing and the outer casing.

The vacuum insulation panel may include a core material which includes a first surface attached to the at least one surface of the outer casing and an envelope material which surrounds a second surface provided opposite the first surface of the core material and side surfaces thereof to cover the core material.

An adhesive layer may be provided between the at least one surface of the outer casing and the first surface of the core material, and the core material may come into contact with the at least one surface of the outer casing through the adhesive layer.

Yet another aspect of the present invention provides a method of manufacturing a refrigerator, which includes an insulating wall formed of at least one of an inner casing and an outer casing of the refrigerator, including attaching an adhesive layer to one surface of the outer casing, attaching a first surface of a core material to the adhesive layer, attaching an envelope material to surround a second surface formed opposite the first surface of the core material and side surfaces thereof, and forming a vacuum in an internal space formed by the attachment of the envelope material.

The method may further include processing the outer casing to correspond to a shape of the inner casing to allow the outer casing to cover the inner casing.

The attaching of the envelope material may include attaching a peripheral portion of the envelope material to the adhesive layer such that the peripheral portion surrounds the second surface and the side surfaces of the core material and is then disposed outside the core material.

The forming of the vacuum in the internal space may include forming a low vacuum state in the internal space using a vacuum suction device which suctions air in the internal space to the outside and forming a high vacuum state from the low vacuum state in the internal space by induction-heating an adsorbent which is provided in the internal space, is activated at a high temperature, and removes at least one of gases and water present in the internal space.

That is, an air conditioner according to the present invention is an air conditioner which has a refrigerant circuit in which a compressor, an outdoor heat exchanger, an expansion valve, and an indoor heat exchanger are annularly connected and further includes a distributor installed between the outdoor heat exchanger and the expansion valve, a plurality of distribution pipes whose one ends are connected to the distributor and the other ends are connected to a plurality of electrothermal pipes of the outdoor heat exchanger, and a bypass pipe whose one end is connected to the compressor and diverges in the way and simultaneously a plurality of other ends are connected to connection parts or thereabouts between the distribution pipes and the electrothermal pipes.

In the case of the air conditioner, since the other ends of the bypass pipe are connected to the connection parts or thereabouts between the distribution pipes and the electrothermal pipes, a high-temperature gas refrigerant may be supplied to the electrothermal pipes while hardly receiving flow resistance of the distribution pipes. Due to this, even in the case of a large outdoor heat exchanger, frost may be completely removed without a decrease in a flow rate of the high-temperature gas refrigerant and a decrease in a defrosting effect.

An auxiliary distributor to which the plurality of electrothermal pipes are connected may be further included. The one ends of the distribution pipes may be connected to the plurality of electrothermal pipes through the auxiliary distributor, and the other ends of the bypass pipe may be connected to the auxiliary distributor.

As described above, since the other ends of the bypass pipe are connected to the auxiliary distributor, divergence of the bypass pipe may be reduced and a cost or weight may be reduced.

As a detailed embodiment, a plurality of such outdoor heat exchanger may be installed and the distributor, the distribution pipes, and the bypass pipe may be installed corresponding to each of the outdoor heat exchangers.

Also, the outdoor heat exchanger may include a plurality of heat exchange elements and a defrosting controller which separately defrosts the heat exchanger elements and converts the heat exchange elements which have been defrosted may be further included. The defrosting controller may start defrosting one heat exchange element and may start defrosting another heat exchange element before finishing the defrosting of the one heat exchange element.

In the case of the air conditioner, since the defrosting controller starts defrosting one heat exchange element and starts defrosting another heat exchange element before finishing the defrosting of the one heat exchange element, water generated by the defrosted heat exchange element may be prevented from being frozen at the other heat exchange element and each of the heat exchange elements may be completely defrosted while continuously performing heating operation.

The plurality of heat exchange elements are vertically installed, and the defrosting controller may sequentially convert the heat exchange elements into the defrosted heat exchange element from an upper heat exchange element to a lower heat exchange element.

As described above, water generated by defrosting of the upper heat exchange element may be completely prevented from being frozen at the lower heat exchange element.

The outdoor heat exchanger may include an upper heat exchange element, a central heat exchange element, and a lower heat exchange element, and a volume of the central heat exchange element may be smaller than a volume of the upper heat exchange element and a volume of the lower heat exchange element.

As described above, the volume of the central heat exchange element is small such that the central heat exchange element may easily become high temperature and water generated by defrosting of the upper heat exchange element may be completely prevented from being frozen at the central heat exchange element.

Also, since the volume of the central heat exchange element is small, a less amount of water may be generated by defrosting the central heat exchange element and the lower heat exchange element may be difficult to be frosted such that a period of time for defrosting the lower heat exchange element may be decreased.

The defrosting controller may defrost the upper heat exchange element and the central heat exchange element at the same time and may convert the defrosted heat exchange elements from the upper heat exchange element into the lower heat exchange element such that the central heat exchange element and the lower heat exchange element may be defrosted at the same time.

As described above, the water generated by defrosting of the upper heat exchange element may be more completely prevented from being frozen at the central heat exchange element and each of the heat exchange elements may be more completely refrosted.

The central heat exchange element may be defrosted while the defrosting controller starts and finishes defrosting the upper heat exchange element, and simultaneously the central heat exchange element may be defrosted while the defrosting controller starts and finishes defrosting the lower heat exchange element.

A heat storage tank which stores heat of the compressor may be further included and may be configured to heat a refrigerant with the heat stored in the heat storage tank and simultaneously to allow the refrigerant to flow to the outdoor heat exchanger through the bypass pipes.

As described above, the refrigerant may be heated using the heat discharged from the compressor such that defrosting operation may be performed with high efficiency. Due to this, a decrease in heating ability during the defrosting operation may be reduced and comfortability of a user may be not damaged during the defrosting operation.

The refrigerant discharged from the heat storage tank may flow into the compressor and then may flow to the outdoor heat exchanger through the bypass pipes.

As described above, the refrigerant discharged from the heat storage tank may further become high temperature such that a defrosting time may be reduced.

As described above, residual ice formed between the upper heat exchange element and the central heat exchange element or residual ice formed between the lower heat exchange element and the central heat exchange element may be completely prevented.

According to one aspect of the present invention, a vacuum insulation panel is disposed to come into contact with an outer casing and a thin insulating wall is formed by allowing a foam solution to foam to form a foam material having a thin thickness such that a sleekly designed refrigerator may be embodied and a storage capacity of the refrigerator may be increased while insulation performance thereof is maintained.

BRIEF DESCRIPTION OF THE DRAWINGS

FIG. 1 is a perspective view illustrating an exterior of the refrigerator according to one embodiment of the present invention;

FIG. 2 is a side cross-sectional view of the refrigerator according to one embodiment of the present invention;

FIG. 3 is a view illustrating components of an insulating wall of the refrigerator according to one embodiment of the present invention;

FIG. 4 is a cross-sectional view of the refrigerator according to one embodiment of the present invention;

FIG. 5 is a cross-sectional view of a refrigerator according to another embodiment of the present invention;

FIG. 6 is a cross-sectional view illustrating a vacuum insulation panel of the refrigerator according to one embodiment of the present invention;

FIG. 7 is an enlarged view illustrating an envelope material of the vacuum insulation panel of the refrigerator according to one embodiment of the present invention;

FIGS. 8 and 9 are cross-sectional views sequentially illustrating a process of manufacturing the vacuum insulation panel of the refrigerator according to one embodiment of the present invention;

FIG. 10 is a cross-sectional view of a refrigerator according to another embodiment of the present invention;

FIG. 11 is a perspective view illustrating some components of the refrigerator according to another embodiment of the present invention;

FIG. 12 is an enlarged view illustrating some components of the refrigerator according to another embodiment of the present invention;

FIG. 13 is a cross-sectional view of a vacuum insulation panel of the refrigerator according to another embodiment of the present invention;

FIG. 14 is a schematic diagram illustrating a case in which a foam solution foams in the refrigerator according to another embodiment of the present invention;

FIG. 15 is a cross-sectional view of the vacuum insulation panel of the refrigerator according to another embodiment of the present invention;

FIG. 16 is a partial perspective view of the refrigerator according to another embodiment of the present invention.

FIG. 17 is a perspective view illustrating an external shape of the refrigerator according to another embodiment of the present invention;

FIG. 18 is a cross-sectional view of the refrigerator according to another embodiment of the present invention;

FIG. 19 is a view illustrating a shape in which a foam solution guide is disposed in the refrigerator according to another embodiment of the present invention;

FIG. 20 is a view illustrating a shape in which the foam solution guide is coupled to a foam solution inlet provided at a machine compartment cover;

FIG. 21 is a perspective view illustrating an external shape of the foam solution guide of the refrigerator according to another embodiment of the present invention;

FIG. 22 is a view illustrating the external shape of the foam solution guide of the refrigerator according to another embodiment of the present invention; and FIG. 23 is a side view illustrating the foam solution guide shown in FIG. 22.

DETAILED DESCRIPTION

The embodiments disclosed in the specification and the components shown in the drawings are merely preferable examples of the present invention, and various modifications capable of replacing the embodiments and drawings of the specification may be made at the time of filing the present application.

Also, throughout the drawings of the present specification, like reference numerals or symbols refer to components or elements configured to perform substantially identical functions.

Also, the terms used herein are intended to explain the embodiments and are not intended to limit and/or define the present invention. Singular forms, unless defined otherwise in context, include plural forms. Throughout the specification, the terms "comprise," "have," and the like are used herein to specify the presence of stated features, numbers, steps, operations, elements, components, or combinations thereof, but do not preclude the presence or addition of one or more other features, numbers, steps, operations, elements, components, or combinations thereof.

Also, even though the terms including ordinals such as "first," "second," and the like may be used to describe various components, the components are not limited by the terms, and the terms are used only for distinguishing one element from others. For example, without departing from the scope of the present invention, a first component may be referred to as a second component, and similarly, the second component may be referred to as the first component.

Also, the terms "front," "front surface," "rear," "rear surface," "top," and "bottom" are used on the basis of a front surface portion of a refrigerator according to one embodiment of the present invention shown in FIG. 1, that is, a side which faces frontward in FIG. 1.

FIG. 1 is a perspective view illustrating an exterior of the refrigerator according to one embodiment of the present invention, FIG. 2 is a side cross-sectional view of the refrigerator according to one embodiment of the present invention, FIG. 3 is a view illustrating components of an insulating wall of the refrigerator according to one embodiment of the present invention, FIG. 4 is a cross-sectional view of the refrigerator according to one embodiment of the present invention, FIG. 5 is a cross-sectional view of a refrigerator according to another embodiment of the present invention, FIG. 6 is a cross-sectional view illustrating a vacuum insulation panel of the refrigerator according to one embodiment of the present invention, and FIG. 7 is an enlarged view illustrating an envelope material of the vacuum insulation panel of the refrigerator according to one embodiment of the present invention.

As shown in FIGS. 1 and 2, a refrigerator 1 may include a body 10 that forms an exterior and a storage compartment 20 provided in the body 10 to have an open front surface.

The body 10 may include an inner casing 40 which forms the storage compartment 20, an insulating wall 60 formed by an outer casing 50 which forms the exterior, and a cool air supplying device (not shown) which supplies cool air to the storage compartment 20.

The cool air supplying device may include a compressor C, a condenser (not shown), an expansion valve (not shown), an evaporator 26, an air blowing fan 27, and the like. Also, a vacuum insulation panel (VIP) 100 provided to prevent an outflow of cool air of the storage compartment 20 and a foam material 200 formed by foaming between the inner casing 40 and the outer casing 50 may be provided in the insulating wall 60. It will be described in detail below.

A machine compartment 70 in which the compressor C which compresses a refrigerant and the condenser which condenses the compressed refrigerant are installed may be provided at a bottom of a rear of the body 10.

The storage compartment 20 is divided into left and right portions by a partition wall 17 such that a refrigerator compartment 21 may be provided on a right side of the body 10 and a freezer compartment 22 may be provided on a left side of the body 10.

The refrigerator 1 may further include a door 30 which opens and closes the storage compartment 20.

The refrigerator compartment 21 and the freezer compartment 22 may be opened and closed by a refrigerator compartment door 31 and a freezer compartment door 33, which are pivotably coupled to the body 10, and a plurality of door guards 35 may be provided at rear sides of the refrigerator compartment door 31 and the freezer compartment door 33 to store food and the like.

The storage compartment 20 may include a plurality of racks 24 provided to divide the storage compartment 20 into a plurality of compartments, and items such as food and the like are stacked on the racks 24.

Also, the storage compartment 20 may include a plurality of storage boxes 25 which are slidably inserted therein and withdrawn therefrom.

The refrigerator 1 may further include a hinge 38 to allow the door 30 to be pivotably coupled to the body 10.

As shown in FIG. 3, the insulating wall 60 may be provided to simultaneously form the storage compartment 20 and form the exterior of the body 10. The insulating wall 60 is formed by the inner casing 40 and the outer casing 50 provided to cover the inner casing 40 outside the inner casing 40, but is not limited thereto and may be formed by any one of the inner casing 40 and the outer casing 50.

The insulating wall 60 may include the partition wall 17 which partitions the refrigerator compartment 21 and the freezer compartment 22 in the storage compartment 20. The partition wall 17 may be formed by the inner casing 40, and may include the vacuum insulation panel 100 and the foam material 200 like the insulating wall 60.

It is necessary for the insulating wall 60 to simultaneously minimize a thermal loss of the storage compartment 20 and maintain strength of the entire refrigerator 1 by securing certain insulation performance.

Accordingly, the insulating wall 60 has to be formed to maintain a certain thickness. However, when the thickness of the insulating wall 60 is provided to be too thick in consideration of insulation performance and strength, a capacity of the storage compartment 20 is reduced, which may be problem.

Accordingly, it is necessary to reduce the thickness of the insulating wall 60 to maximize the storage capacity of the storage compartment 20 within a range in which insulation performance and strength are maintained.

For this, as shown in FIG. 4, the vacuum insulation panel 100 which has excellent insulation performance and the foam material 200 formed by foaming in a foaming space S formed between the inner casing 40 and the outer casing 50 may be provided between the inner casing 40 and the outer casing 50.

In detail, the foam material 200 may be formed to have a thickness of 5 mm to 10 mm to simultaneously form the insulating wall 60 having an ultrathin thickness and be disposed on each of surfaces which form the outer casing 50, that is, a top surface 51, both side surfaces 52 and 53, and a rear surface 54 of the outer casing 50, such that the insulating wall 60 may be formed to secure insulation performance.

The foam material 200 is formed by a foam solution being filled in a space between the inner casing 40 and the outer casing 50.

In detail, in a process of manufacturing the refrigerator 1, the inner casing 40 and the outer casing 50 are assembled and then a foam solution foams in an interior space between the inner casing 40 and the outer casing 50 through a foam solution inlet 72 provided at a machine compartment cover 71 which covers the machine compartment 70.

The foam solution flows toward the foaming space S in which the vacuum insulation panel 100 is not located and is filled therein such that an inside of the insulating wall 60 is formed.

Here, since a thickness of the foam material 200 is restricted between 5 mm to 10 mm, the thickness of the foam material 200 is preferably formed to be less than 7 mm, a thickness of the foaming space S to which the foam solution flows is formed like this, and thus a flow of the foam solution may not be smoothly performed.

Accordingly, a problem in which the entire foaming space S is not evenly filled may occur, but such a problem may be solved by an improved disposition of a foam solution guide 400 and disposing the vacuum insulation panel 100 to come into contact with the outer casing 50.

The vacuum insulation panel 100 provided on the ultrathin insulating wall 60 may be attached to an inside of the outer casing 50. This allows the foam solution to smoothly flow and additionally minimizes a dead zone in the insulating wall 60 to provide the insulating wall 60 to have a small thickness.

Through this, the insulating wall 60 may be formed such that the insulating wall 60 at the freezer compartment 22 may have a maximum thickness of 26 mm and the insulating wall 60 at the refrigerator compartment 21 may have a maximum thickness of 17 mm.

Also, since the vacuum insulation panel 100 is attached to the outer casing 50 in a plate shape before being processed to be in an exterior shape of the body 10 and then the outer casing 50 may be processed to be in the exterior shape of the body 10, a process of manufacturing the refrigerator 1 is easy. Also, the vacuum insulation panel 100 is attached before the outer casing 50 is assembled with the inner casing 40 such that the process of manufacturing the refrigerator 1 may be easy.

As shown in FIGS. 2 and 4, the vacuum insulation panel 100 may be attached to and disposed on each of the top surface 51, the left side surface 52, the right side surface 53, and the rear surface 54.

Also, the vacuum insulation panel 100 may be attached to and disposed on one surface of the inner casing 40, which forms the partition wall 17. The vacuum insulation panel 100 attached to the inner casing 40 may be attached to the inner casing 40 in a plate shape before the inner casing 40 is processed to be in a shape which forms the storage compartment 20 and then the inner casing 40 may be processed like the process of manufacturing the outer casing 50, or may be alternatively attached to one surface of the inner casing 40 after the inner casing 40 is processed to be in a shape which forms the storage compartment 20.

The vacuum insulation panel 100 may be provided to extend toward a front and a rear of the refrigerator 1 on the basis of FIG. 4. That is, the vacuum insulation panel 100 may be provided to cover the top surface 51 and the side surfaces 52 and 53 of the outer casing 50 which forms the insulating wall 60 in front and rear directions, and may be provided to cover the rear surface 54 in upper and lower directions.

The vacuum insulation panel 100 arranged on the top surface 51 and the side surfaces 52 and 53 may be provided to extend to positions adjacent to one end located in front of each of the top surface 51 and the side surfaces 52 and 53.

In detail, one end provided in front of the vacuum insulation panel 100 may extend frontward to be spaced a certain distance apart from the one end of each of the top surface 51 and the side surfaces 52 and 53. The certain distance refers to a distance capable of allowing the foam material 200 to be filled to cover the one end of the vacuum insulation panel 100.

Accordingly, the vacuum insulation panel 100 may extend to a position which forms a distance of 5 mm to 10 mm from the one end of each of the top surface 51 and the side surfaces 52 and 53.

However, as shown in FIG. 5, in a refrigerator according to another embodiment of the present invention, the vacuum insulation panel 100 may extend to a position at distances of 10 mm or more from one end 58 of each of the top surface 51 and the side surfaces 52 and 53.

A part adjacent to the one end 58 of each of the top surface 51 and the side surfaces 52 and 53 is a position at which the outer casing 50 and the inner casing 40' are assembled such that a flange (not shown) for assembly of the inner casing 40' and the outer casing 50 inside the insulating wall 60 may be provided and a hot pipe (not shown) for preventing a dew-forming phenomenon on the front surface of the refrigerator 1 may be provided.

Accordingly, a larger number of components may be located internally at one part of an insulating wall 60', which includes one end provided in front of the refrigerator 1, and the vacuum insulation panel 100 may not be disposed on one side of the insulating wall 60' to secure a space for arranging the above components on the one side of the insulating wall 60'.

When an area of the insulating wall 60' which does not include the vacuum insulation panel 100 is referred to as a first area 60a' and an area of the insulating wall 60' which extends from the first area 60a' in a rearward direction is referred to as a second area 60b' based on front and rear directions of the refrigerator 1, the first area 60a' may not include the vacuum insulation panel 100 and may have a greater thickness than the second area 60b'.

Since the vacuum insulation panel 100 having excellent insulation performance is not disposed in the first area 60a', insulation performance thereof may be low in comparison to the second area 60b'. Accordingly, to maintain at least the same insulation performance, the thickness of the foam material 200 may be formed to be thick to secure insulation performance.

Also, as described above, since a flange (not shown) which assembles the inner casing 40' and the outer casing 50 and a hot pipe (not shown) are provided in the first area 60a' and a gasket (not shown) in contact with the refrigerator compartment door 31 and the freezer compartment door 33 may be provided at a front surface of the first area 60a', a thickness for assembling the gasket is necessary and the first area 60a' may be formed to be thicker than the second area 60b'.

However, like the above-described embodiment, the foam material 200 provided in the second area 60b' may be provided to have a thickness of 5 mm to 10 mm.

Although the partition wall 17 is formed of only the inner casing 40' and does not include a component like a flange (not shown), a partition wall located at the one end 58 which faces frontward may be identically formed to be the first area 60a' and the second area 60b' for increasing insulation performance of the refrigerator 1 and assembling the gasket provided at the one end 58.

Hereinafter, the vacuum insulation panel 100 and a feature in which the vacuum insulation panel 100 is in contact with the outer casing 50 will be described.

As shown in FIG. 5, the vacuum insulation panel 100 may include a core material 110, an envelope material 120, and an adhesive layer 130 which allows the core material 110 to come into contact with the outer casing 50.

The core material 110 may include a glass fiber having excellent insulation performance. Here, to obtain a high heat insulation effect, it is necessary to form the core material 110 in a structure in which panels formed as thinly as possible by weaving the glass fiber are stacked. In detail, since an influence of radiation, which is insulation performance, may be minimized when a pore size among glass fibers is smaller, a high heat insulation effect may be expected.

The core material 110 may include at least one of an organic fiber and an inorganic fiber. Also, the core material 110 may have a length of 0.1 to 300 mm and a diameter of 0.1 to 10 um.

The core material 110 may include a first surface 111 formed in a rectangular parallelepiped shape and provided to come into contact with one surface of the outer casing 50. The first surface 111 may be provided to come into contact with the one surface of the outer casing 50 without a medium.

The first surface 111 may come into contact with and be disposed on the one surface of the outer casing 50 with a double-sided tape or an adhesive.

The adhesive layer 130 may be provided between the first surface 111 of the core material 110 and the one surface of the outer casing 50.

The adhesive layer 130 may be formed to have a thickness of about 50 µm or less, and may be formed of a film member of a resin material which has low gas permeability, such as low density polyethylene (LDPE), linear low density polyethylene (LLDPE), polyvinylidene chloride (PVDC), and the like. The adhesive layer 130 according to one embodiment of the present invention may include LLDPE.

One surface of the adhesive layer 130 is attached to the one surface of the outer casing 50, and the other surface of the adhesive layer 130 is attached to the first surface 111 of the core material 110 such that the core material 110 may remain in a state of being attached to the outer casing 50.

The adhesive layer 130 may be provided to have a size at least corresponding to the first surface 111. The adhesive layer 130 may be provided to have the same size as that of the first surface 111 to allow the first surface 111 to come into contact with the outer casing 50, and may preferably be provided to have a larger area than the first surface 111.

This is to provide an area in which the envelope material 120, which will be described, surrounds the core material 110 and comes into contact with the adhesive layer 130.

As described above, the adhesive layer 130 may be provided to have an area at least corresponding to the first surface 111, but is not limited thereto and may be provided in a quadrangular ring shape corresponding to an edge of the first surface 111.

The adhesive layer 130 may maintain a contact state between the outer casing 50 and the core material 110 through welding or adhesion.

As the first surface 111 of the core material 110 comes into direct contact with the outer casing 50, since an amount of the envelope material 120 equal to an area thereof corresponding to the first surface 111 is unnecessary, production cost may be reduced and a double-sided tape for contact between the envelope material 120 and the outer casing 50 is unnecessary such that production costs may also be reduced according thereto.

The envelope material 120 may be provided to cover the core material 110 except the first surface 111 of the core material 110. That is, the envelope material 120 may be provided in a shape which surrounds the core material 110 outside the core material 110 to cover all of a second surface 112 formed opposite the first surface 111 and a side surface 113 formed between the first surface 111 and the second surface 112.

Accordingly, a space which covers the core material 110 is formed inside the envelope material 120, and the envelope material 120 may perform a function of protecting the core material 110 from an outside of the envelope material 120.

The envelope material 120 is a very significant element for maintaining a lifespan of the vacuum insulation panel 100 by blocking fine gases and water which permeate a vacuum state.

As shown in FIG. 7, the envelope material 120 may be provided as a plurality of layers. The envelope material 120 may include a shielding layer 120a. The shielding layer 120a may prevent water and gases from permeating into the core material 110 provided inside the envelope material 120. The shielding layer 120a may include at least one of a metal foil, an inorganic deposition film, and a polymer resin.

A protection layer 120b may be disposed outside the shielding layer 120a. Since the shielding layer 120a is fragile when the shielding layer 120a is formed of a very thin metal, like one embodiment of the present invention, the protection layer 120b is provided to prevent such fragility.

The protection layer 120b may include a resin material capable of protecting the shielding layer 120a, such as polyethylene terephthalate and nylon.

An envelope material contact layer 120c may be disposed inside the shielding layer 120a. The envelope material contact layer 120c may be welded or adhered to the adhesive layer 130 or the outer casing 50 to allow the envelope material 120 to come into direct contact with the adhesive layer 130 or the outer casing 50.

When the envelope material contact layer 120c comes into contact with the adhesive layer 130 like one embodiment of the present invention, the envelope material contact layer 120c may be provided to have the same material as the adhesive layer 130.

A contact force may be increased by heat-welding the envelope material contact layer 120c and the adhesive layer 130. Accordingly, the envelope material contact layer 120c may be formed of a resin material such as LDPE, LLDPE, PVDC, and the like. According to one embodiment of the present invention, the envelope material contact layer 120c may be formed of LLDPE.

The envelope material 120 may be provided to be heat-welded to the adhesive layer 130 while covering the entirety of the core material 110 except the first surface 111 of the core material 110 to allow the core material 110 to be in a vacuum. In detail, a peripheral portion 121 of the envelope material 120, which is left after the core material 110, may be provided to come into contact with a peripheral side of the adhesive layer 130 located outside the first surface 111, and the envelope material contact layer 120c, which is disposed on the peripheral portion 121, and the adhesive layer 130 are heat-welded such that the core material 110 may be sealed.

Unlike one embodiment of the present invention, the adhesive layer 130 may not be located between the core material 110 and the outer casing 50. Here, the first surface 111 of the core material 110 may come into direct contact with the one surface of the outer casing 50.

As described above, the core material 110 may be provided to come into contact with the outer casing 50 through a double-sided tape or an adhesive, and may be disposed on the outer casing 50 while not being adhered thereto and may then come into contact with the outer casing 50 by being supported by the envelope material 120 through the sealing of the envelope material 120.

When the adhesive layer 130 is not located between the core material 110 and the outer casing 50, the envelope material 120 may be provided to surround the core material 110 and then directly attached to the one surface of the outer casing 50.

Also, unlike one embodiment of the present invention, the envelope material 120 may be provided to cover an entire surface area of the core material 110. That is, the first surface 111 of the core material 110 is not directly attached to the outer casing 50, and one surface of the envelope material 120, which surrounds the core material 110, may be provided to be attached to the one surface of the outer casing 50.

Here, the envelope material 120 may be attached to the outer casing 50 by using a general adhesive or a rigid-adhesive foaming agent between the one surface of the outer casing 50 and the one surface of the envelope material 120 attached to the one surface of the outer casing 50.

Here, the adhesive may be applied to coat a surface of the envelope material 120 with a thickness of about 100 μm, and may include a polymer material having low heat conductivity such as a rubber.

The rigid adhesive foaming agent may be provided to include a polyurethane material, and may increase an adhesive force between the envelope material 120 and the outer casing 50 by the foaming agent being heated.

In a process in which the envelope material 120 covers and seals the core material 110, an internal space formed by the envelope material 120 and in which the core material 110 is located has to be formed in the vacuum state.

For this, a manufacturing process in which the envelope material 120 is covered may be performed in a vacuum chamber, or a manufacturing process of absorbing air in the internal space of the envelope material 120 using a vacuum suction device may be provided.

When the vacuum suction device is used, one side of the peripheral portion 121 may be primarily welded while being open, and may be connected to an adsorption nozzle of the vacuum suction device to suction the air in the internal space of the envelope material 120. Afterward, the one side of the peripheral portion 121 may be secondarily welded such that the internal space of the envelope material 120 may remain in the vacuum state.

The vacuum insulation panel 100 may further include the adsorbent (not shown).

The adsorbent is disposed or inserted in the core material 110, and is for maintaining an excellent vacuum state in the vacuum insulation panel 100 by adsorbing at least one of a gas and water which are present in the vacuum insulation panel 100 or flow in from the outside of the vacuum insulation panel 100.

The adsorbent is provided to be activated at a high temperature by a heating inducement device to remove any one of a gas and water which are present in the internal space of the envelope material 120 or permeate into the envelope material 120 from the outside.

Particularly, the adsorbent allows the internal space of the envelope material 120 to be formed to be in a first vacuum state by the vacuum suction device and then to be in a secondary vacuum state such that the internal space of the envelope material 120 may be formed to be in a high vacuum state.

Hereinafter, a process of disposing the vacuum insulation panel 100 to be in contact with the outer casing 50 and a process of manufacturing the outer casing 50 on which the vacuum insulation panel 100 is disposed will be described.

FIGS. 8 and 9 are cross-sectional views sequentially illustrating a process of manufacturing the vacuum insulation panel of the refrigerator according to one embodiment of the present invention.

The outer casing 50 may include a steel sheet. Due to excellent rigidity and durability thereof, the steel sheet may increase rigidity of the outer casing 50 which forms the body 10. The steel sheet according to one embodiment of the present invention may be a pre-coated metal (PCM) steel sheet.

The process of manufacturing the outer casing 50 may begin with transferring a PCM steel sheet in a plate shape to a processing line. The transferred PCM steel sheet may be cut to a size which forms the outer casing 50 by a pressing method.

Afterward, the adhesive layer 130 is attached to one surface of the PCM steel sheet in a plate shape, which is formed to a certain size, as shown in FIG. 8. One surface of the adhesive layer 130 may be attached to one surface of the outer casing 50 of the PCM steel sheet such that the vacuum insulation panel 100 may be attached to the outer casing 50.

Afterward, the core material 110 is disposed on the one surface of the outer casing 50, in detail, the other surface of the adhesive layer 130. Both sides of the adhesive layer 130 are attached to the outer casing 50 and the core material 110 such that the core material 110 may come into contact with and be attached to the outer casing 50.

As the first surface 111 comes into contact with the outer casing 50 through a medium (the adhesive layer 130 in one embodiment of the present invention), the insulating wall 60 is formed while the vacuum insulation panel 100 comes into contact with the outer casing 50.

Subsequently, as shown in FIG. 9, the envelope material 120 is attached to and surrounds the second surface 112 and the side surfaces 113 of the core material 110 such that the core material 110 is disposed therein such that the installation of the vacuum insulation panel 100 in the outer casing 50 is completed as shown in FIG. 6.

Also, like the embodiment of the present invention, the envelope material contact layer 120c of the envelope material 120 and the film member 130 come into contact with each other to maintain the core material 110 in the vacuum state, but are not limited thereto. An adhesive layer (not shown) formed of an adhesive material is formed on any one of the outer casing 50 and the envelope material 120, and then the peripheral portion 121 of the envelope material 120 may come into contact with the one surface of the outer casing 50 through the adhesive layer (not shown).

Afterward, to form the vacuum state of an internal space formed by the contact between the envelope material 120 and the adhesive layer 130, air in the internal space may be suctioned outward by a vacuum suction device.

The vacuum suction device may include a nozzle which suctions air, and the nozzle may pass through one side of the peripheral portion 121 and communicate with the internal space of the envelope material 120. Afterward, the vacuum suction device is operated to suction air in the internal space of the envelope material 120 such that the internal space may be in a low vacuum state.

Afterward, the nozzle of the vacuum suction device is removed from the peripheral portion 121 while the peripheral portion 121 is heat-welded such that the peripheral portion 121 and the adhesive layer 130 may be completely sealed.

A heating inducement device may be used to form the vacuum insulation panel 100 in the low vacuum state to be the vacuum insulation panel 100 in a high vacuum state. The heating inducement device may form a high vacuum in the internal space of the envelope material 120 by selectively heating an adsorbent (not shown) provided in the internal space without contact therebetween.

Preferably, the internal space of the envelope material 120, which goes through a first decompression process, may have a vacuum level of 0.05 torr to several tens of torr, and the internal space of the envelope material 120, which goes through a second decompression process, may have a vacuum level of 0.01 torr or less.

The non-contact heating method may include electric heating. The electric heating refers to converting electric energy into heat energy and heating an object therewith. The electric heating may include, for example, resistance heating, dielectric heating, induction heating, infrared heating, electronic beam heating, laser heating, and the like.

As a method of heating an adsorbent 120 according to one embodiment of the present invention, induction heating, more particularly, high-frequency induction heating using a high frequency of 200 KHz to 300 KHz is preferable. However, a type of electromagnetic wave is not limited thereto and may be diversely changed according to a type and amount of the adsorbent.

After the vacuum insulation panel 100 is attached to the outer casing 50, the outer casing 50 may be processed to form an exterior of the body 10, and may be coupled to the inner casing 40 to form the insulating wall 60.

Hereinafter, an auxiliary vacuum insulation panel 300 according to another embodiment of the present invention will be described. Components in addition to components of the auxiliary vacuum insulation panel 300, which will be described below, are the same as those of the above-described embodiment, descriptions thereof will be omitted.

FIG. 10 is a cross-sectional view of a refrigerator according to another embodiment of the present invention, FIG. 11 is a perspective view illustrating some components of the refrigerator according to another embodiment of the present invention, and FIG. 12 is an enlarged view illustrating some components of the refrigerator according to another embodiment of the present invention.

As described above, the vacuum insulation panel 100 may be disposed to come into contact with the top surface 51, the side surfaces 52 and 53, and the rear surface 54, which form the outer casing 50. As described above, when the vacuum insulation panel 100 is disposed corresponding to each of the surfaces of the outer casing 50 as shown in FIG. 4, areas in which the vacuum insulation panel 100 is not disposed may occur between both side surfaces of the vacuum insulation panel 100 disposed on the rear surface 54 and rear surfaces of the vacuum insulation panels 100 disposed on the side surfaces 52 and 53.

Also, as shown in FIG. 2, an area in which the vacuum insulation panel 100 is not disposed may occur between a rear surface of the vacuum insulation panel 100 disposed on the top surface 51 and a top surface of the vacuum insulation panel 100 disposed on the rear surface 54.

That is, the vacuum insulation panel 100 may not be provided at a corner portion 55 formed between surfaces of the outer casing 50. This is to secure a pressurizing area for forming the corner portion 55 by bending the outer casing 50 in a plate shape in a manufacturing process of primarily attaching the vacuum insulation panel 100 and processing the outer casing 50 to have an exterior shape of the body 10.

Since the insulating wall 60 of the refrigerator 1 according to one embodiment of the present invention is formed to be in an ultrathin shape to minimize a thickness thereof, when the vacuum insulation panel 100 is not included in some areas, a great thermal loss occurs such that performance of the refrigerator 1 may be decreased.

Accordingly, the auxiliary vacuum insulation panel 300 may be provided at each of corner portions 55 formed by the top surface 51 and the rear surface 54 and each of corner portions 55 formed by the side surfaces 52 and 53 and the rear surface 54 to secure insulation performance.

As shown in FIG. 10, the auxiliary vacuum insulation panel 300 may be disposed at the corner portion, and may be disposed between the side surfaces of the vacuum insulation panel 100 disposed on the surfaces of the outer casing 50. The auxiliary vacuum insulation panel 300 may be provided to have a rectangular parallelepiped shape like the vacuum insulation panel 100.

The pressurizing area for forming the corner portion 55 may be preferably provided to have a length of 25 mm in a bending direction. Accordingly, the auxiliary vacuum insulation panel 300 may be formed to be provided in an area at least corresponding to the length of 25 mm.

The auxiliary vacuum insulation panels 300 disposed at the corner portions 55 formed by the side surfaces 52 and 53 and the rear surface 54 are formed to extend in upward and downward directions of the refrigerator 1 and are disposed to extend in at least one of forward and backward or leftward and rightward directions to secure insulation performance of the corner portions 55.

Also, The auxiliary vacuum insulation panel 300 disposed at the corner portion 55 formed by the top surface 51 and the rear surface 54 is formed to extend in the leftward and rightward directions of the refrigerator 1 and is disposed to extend in at least one of upward and downward or forward and backward directions to secure insulation performance of the corner portions 55.

As shown in FIG. 12, an auxiliary vacuum insulation panel 300' may be provided in a bent shape. The auxiliary vacuum insulation panel 300' may include a bent portion 310' bent in an L shape and an extension portion 320' which extends two ways from the bent portion 310'.

The above-described auxiliary vacuum insulation panel 300 may be provided to be in a rectangular parallelepiped shape in which any one side of the rectangular parallelepiped extends in the upward and downward directions or leftward and rightward directions of the refrigerator 1 to be disposed at the corner portion 55.

Accordingly, according to distances between each side surfaces of the vacuum insulation panels 100 disposed on the outer casing 50, an arrangement of the auxiliary vacuum insulation panels 300 is not uniform and the auxiliary Vacuum insulation panels 300 may be irregularly disposed according to the distances between each of the side surfaces.

However, when the auxiliary vacuum insulation panel 300 of the insulating wall 60 includes the bent portion 310', the bent portion 310' may overlap the corner portion 55 such that the arrangement of the auxiliary vacuum insulation panels 300 may be easily performed.

The extension portions 320' are provided to extend to the side surfaces of the vacuum insulation panels 100 disposed on the top surface 51, the side surfaces 52 and 53, and the rear surface 54 such that the vacuum insulation panels 100 and the auxiliary vacuum insulation panels 300' may be disposed in most areas of the insulating wall 60 to increase performance of the refrigerator 1.

Hereinafter, a vacuum insulation panel 100' according to another embodiment of the present invention will be described. Hereinafter, since components in addition to components of the vacuum insulation panel 100', which will be described below, are the same as those of the above-described embodiment, descriptions thereof will be omitted.

FIG. 13 is a cross-sectional view of a vacuum insulation panel of the refrigerator according to another embodiment of the present invention, FIG. 14 is a schematic diagram illustrating a case in which a foam solution foams in the refrigerator according to another embodiment of the present invention, FIG. 15 is a cross-sectional view of the vacuum insulation panel of the refrigerator according to another embodiment of the present invention, and FIG. 16 is a partial perspective view of the refrigerator according to another embodiment of the present invention.

As described above, since the insulating wall 60 according to the embodiment of the present invention is formed in an ultrathin shape including the foam material 200 having a thin thickness, the foaming space S in which a foam solution foams is small such that a problem in which a foaming flow is not smoothly performed during the foaming of the foam solution may occur.

To solve this, as shown in FIG. 13, a side portion 122 of the envelope material 120 which forms the side surface of the vacuum insulation panel 100 may be provided in a round shape.

When the side portion 122 of the envelope material 120 is formed to be perpendicular to the outer casing 50, the foam solution may not reach the corner portion formed between the outer casing 50 and the side portion 122 and the side portion 122 may be formed to be perpendicular to a flow direction of the foam solution and may restrict the flow of the foam solution.

Particularly, since the most foaming space S formed between the vacuum insulation panel 100 and the inner casing 40 in the insulating wall 60 is formed to have a thickness of 5 mm to 10 mm and a flow of the foam solution may be poorer than that of a foam solution in an insulating wall of a general refrigerator, it is necessary to minimize the restriction of the flow of the foam solution by the side portion 122.

Accordingly, as shown in FIG. 14, when a side portion 122' is provided in a round shape, a foam solution which moves toward the side portion 122' may be easily guided to the foaming space S between the vacuum insulation panel 100' and the inner casing 40 to increase fluidity of the foam solution.

Also, since an angle of a corner side formed by the side portion 122' and the outer casing 50 is shallow such that the foam solution may easily approach the side portion 122', the foam solution may be uniformly filled around the side portion 122'.

To provide the above-described side portion 122' in a round shape, a side surface 113' of a core material 110' may be provided in a round shape. In detail, an area of a first surface 111' is provided to be larger than an area of a second surface 112' such that the side surface 113' which connects the first surface 111' with the second surface 112' may be provided in a curved shape which faces the second surface 112' from the first surface 111'.

This is because an envelope material 120' is provided in a shape which surrounds the core material 110' during a process of manufacturing the vacuum insulation panel 100' such that the shape of the envelope material 120' is provided corresponding to a shape of the core material 110'.

Accordingly, the side portion 122' of the envelope material 120' may be provided in a shape corresponding to a shape of the side surface 113' of the core material 110'. The side portion 122' may be provided in a shape introduced into the core material 110' like another embodiment of the present invention, but is not limited thereto and may be provided in a shape convex toward the outside of the core material 110'. As described above, the shape of the side portion 122' may vary according to the shape of the side surface 113' of the core material 110'.

As shown in FIGS. 15 and 16, a vacuum insulation panel 100" may include a wrinkle area 125 at a side portion 122" thereof. The wrinkle area 125 may include a plurality of wrinkles formed at uniform intervals.

In detail, the wrinkle area 125 may be provided at the side portion 122" of an envelope material 120", and may include a plurality of valleys 125a formed to be inwardly concave from the envelope material 120" and a plurality of ridges 125b formed to be outwardly convex from the envelope material 120".

The plurality of valleys 125a and the plurality of ridges 125b may be alternately provided and formed in a zigzag shape.

The plurality of valleys 125a and the plurality of ridges 125b may be provided to be at uniform intervals. Accordingly, the wrinkles formed in the wrinkle area 125 may be formed at uniform intervals. However, the wrinkles are not limited thereto, and the plurality of valleys 125a and the plurality of ridges 125b may be provided at irregular intervals.

Also, the wrinkles are not limited to one embodiment of the present invention, and the plurality of valleys 125a may be concavely introduced to different depths in the envelope material 120" and the plurality of ridges 125b may be convexly outward from the envelope material 120" with different lengths.

As described above, the wrinkle area 125 may be formed to correspond to a shape of a side portion 113" of a core material 110". Accordingly, a wrinkle shape corresponding to the wrinkles of the wrinkle area 125 may be formed at the side portion 113" of the core material 110" according to another embodiment of the present invention.

A surface area of the side portion 122" formed by the wrinkle area 125 to be a side surface may be increased. Accordingly, during foaming of a foam solution, a filling property may be increased between the foam solution filled into a space on a side of the side portion 122" and the side portion 122". Accordingly, a bonding force between the foam material 200 and the vacuum insulation panel 100 may increase, and rigidity of the insulating wall 60 may increase.

Also, the wrinkles of the wrinkle area 125 smoothly guide the foam solution which foams toward the side portion 122" toward the outside of the side portion 122" such that the foam solution may smoothly flow from the side portion 122" toward the foaming space S between the vacuum insulation panel 100 and the inner casing 40.

In addition, the wrinkle area 125 may reduce gas permeation between the envelope material 120 and the outside of the envelope material 120 such that a lifespan of the vacuum insulation panel 100 may be extended.

In detail, the wrinkle area 125 may restrict a flow of a gas which moves from the outer casing 50 toward the inner casing 40 using the plurality of valleys 125a introduced into the core material 110" such that the gas permeation may be prevented.

Hereinafter, a foam solution guide 400 according to another embodiment of the present invention will be described. Since components in addition to components of the foam solution guide 400, which will be described below, are the same as those of the above-described embodiment, descriptions thereof will be omitted.

FIG. 16 is a partial perspective view of a refrigerator according to another embodiment of the present invention, FIG. 17 is a perspective view illustrating an external shape of the refrigerator according to another embodiment of the present invention, FIG. 18 is a cross-sectional view of the refrigerator according to another embodiment of the present invention, FIG. 19 is a view illustrating a shape in which a foam solution guide is disposed in the refrigerator according to another embodiment of the present invention, FIG. 20 is a view illustrating a shape in which the foam solution guide is coupled to a foam solution inlet provided at a machine compartment cover, and FIG. 21 is a perspective view illustrating an external shape of the foam solution guide of the refrigerator according to another embodiment of the present invention.

As shown in FIGS. 18 and 19, a foam solution inlet 72 is provided at the machine compartment cover 71 which covers the machine compartment 70 to allow a foam solution to foam in the foaming space S of the insulating wall 60.

The foam solution inlet 72 is provided at a position corresponding to the foaming space S at a rear surface of the body 10 to allow the foam solution to foam toward the foaming space S at the rear side of the body 10 in the foaming space S between the inner casing 40 and the outer casing 50.

The foam solution inlet 72 is provided at a central part of the machine compartment cover 71 to uniformly fill the foaming space S in the insulating wall 60 with the foam solution inserted through the foam solution inlet 72.

The foam solution guide 400 may fill the inside of the insulating wall 60 with the foam solution by guiding a foam solution discharged from a foaming head 410 connected to the foam solution inlet 72 provided at the machine compartment cover 71 thereto.

According to another embodiment of the present invention, only one foam solution inlet 72 is provided and only one foaming head 410 is configured corresponding thereto, but embodiments are not limited thereto and a plurality of such foam solution inlets may be provided and a plurality of such foaming heads may be configured corresponding thereto.

When the foaming head 410 is connected to the foam solution inlet 72 and discharges the foam solution, the foam solution is inserted into and filled in the foaming space S from the foam solution inlet 72. Here, in the case of the refrigerator 1' which includes the insulating wall 60 having a small thickness due to a small gap between the inner casing 40 and the outer casing 50, since the foaming space S is small, fluidity is low, and a flow of the foam solution is interfered with by obstacles such as a duct (not shown), a wire (not shown), and the like such that a discharge distance is decreased, it is impossible to uniformly fill the entire foaming space S.

Also, to uniformly fill the entire foaming space S, it is necessary to inject an excessive amount of the foam solution which foams in the foaming space S in comparison to a volume of the foaming space S.

When the foam solution is excessively injected, a curing time of the foam solution which foams in the foaming space S is increased, and the foam material is formed while a part of the foam solution is exposed outside the foaming space S such that an aesthetic sense of an external shape and quality of the refrigerator are deteriorated. Also, since it is necessary to remove foam material exposed outward from the foaming space S, a period of time for filling the foaming space S with the foam solution is increased and it is inconvenient. When the foaming head 410 is poorly managed, a void phenomenon in which crater-shaped pores are generated at a surface of the foam solution which is cured in the foaming space S may occur.

To prevent the above problem, the foam solution guide 400 is provided to guide the foam solution discharged from the foaming head 410 to a part which extends a certain distance into the foaming space S from the foam solution inlet 72 without being interfered with by obstacles and the like.

One end of the foam solution guide 400 is connected to the foam solution inlet 72 in the foaming space S, and the other end thereof extends into the foaming space S and guides the foam solution discharged from the foaming head 410.

In detail, the foam solution guide 400 may be disposed to be adjacent to the rear surface 54 and may be provided to extend from the machine compartment 70 toward a top of the refrigerator 1' between the vacuum insulation panel 100 attached to the rear surface 54 and the inner casing 40.

As described above, since the foaming space S between the vacuum insulation panel 100 and the inner casing 40 has a thickness of 5 mm to 10 mm and a flow velocity of the foam solution may be decreased, the foam solution guide 400 is extended between the vacuum insulation panel 100 and the inner casing 40 to reduce a flow distance of the foam solution between the vacuum insulation panel 100 and the inner casing 40 such that a flow velocity of the foam solution may be maintained.

As shown in FIGS. 19 and 20, the foam solution guide 400 includes a connector 420 coupled to the foam solution inlet 72 and a guide body 430 connected to the connector 420 to extend into the foaming space S.

The guide body 430 may be provided in a wide pipe shape having a hollow. A minor axis of the hollow may be provided to be shorter than 5 mm to 10 mm, which is a distance between the vacuum insulation panel 100 and the inner casing 40, and a major axis of the hollow may be adequately provided in leftward and rightward directions of the rear surface 54 according to a capacity of the refrigerator 1'.

The foam solution guide 400 guides the foam solution discharged from the foaming head 410 by a length of the guide body 430 in the foaming space S without being interfered with by obstacles in the foaming space S.

Since an initial discharge position of the foam solution discharged from the foaming head 410 is extended by the guide body 430 by the length of the guide body 430 in the foam solution inlet 72 in the foaming space S and then the initial discharge position of the foam solution extends from a bottom end toward a central part of the rear surface of the body 10, interference caused by obstacles in the foaming space S is minimized and high pressure of the foam solution is maintained while the foam solution passes through the guide body 430 such that the entire foaming space S may be uniformly filled with the foam solution, the foam solution may flow at high pressure between the vacuum insulation panel 100 and the inner casing 40 between which the foaming space S is particularly narrow, and an injection amount of the foam solution may be minimized.

Also, when the foam solution foams, since a void phenomenon which occurs at the surface of the foam solution due to surface friction while the foam solution is cured in the foaming space S may be prevented and the injection amount of the foam solution may be minimized, the foam solution is not exposed outward such that a working time may be reduced.

As shown in FIG. 21, the guide body 430 may include a foam solution outlet 433 connected to the connector 420 through the hollow and discharging the foam solution at one end of the guide body 430.

Since the guide body 430 may include a diverging portion 431 provided between the connector 420 and the foam solution outlet 433, a plurality of such foam solution outlets 433 may be provided.

The guide body 430 according to one embodiment of the present invention may include two foam solution flow paths 432 at the diverging portion 431 and two foam solution outlets 433 which each correspond to one end of each of the two foam solution flow paths 432.

The foam solution flow paths 432 may diverge at the diverging portion 431 in leftward and rightward directions of the refrigerator 1'.

Accordingly, the foam solution spreads while being diverged in two directions such that the entire foaming space S may be efficiently filled. The guide body 430 which includes the diverging portion 431 may include a Y-shaped hollow.

Since the foam solution is discharged from the rear surface 54 and flows toward the foaming spaces S located at the left side surface 52, the right side surface 53, and the top surface 51 to be filled therein, the foam solution outlets 433 are disposed to be adjacent to the left side surface 52 and the right side surface 53 to effectively fill one end of each of the left side surface 52 and the right side surface 53 adjacent to openings with the foam solution.

As shown in FIGS. 22 and 23, the foam solution flow paths 432 may diverge at the diverging portion 431 in frontward and rearward directions as well as the leftward and rightward directions.

As described above, the foaming space S provided between the vacuum insulation panel 100 and the inner casing 40 has a thin thickness of 5 mm to 10 mm, but a partial area thereof may have a thickness of 10 mm or more as necessary. Also, the foaming space S may be diversely provided according to a thickness of the insulating wall 60 except a space between the vacuum insulation panel 100 and the inner casing 40.

Here, the foam solution flow paths 432 may be disposed to be spaced apart from the diverging portion 431 in the frontward and rearward directions to efficiently fill the entire foaming space S with the foam solution corresponding to a step formed in the foaming space S.

Accordingly, a first foam solution flow path 432 of the foam solution flow path 432 may be formed at the same position as that of the diverging portion 431 based on the frontward and rearward directions of the refrigerator 1', and a second foam solution flow path 432' may be formed to be spaced a certain interval from the diverging portion 431 in the frontward and rearward directions.

Foam solution outlets 433 and 433' may be provided at one ends of the foam solution flow paths 432 and 432' such that the foam solution foams at different positions based on the frontward and rearward directions.

Particular embodiments have been illustrated and described above. However, it should be appreciated by one of ordinary skill in the art that various changes may be made without departing from the technical concept of the present invention defined in the claims.

The invention claimed is:

1. A refrigerator comprising:
   an inner casing;
   an outer casing which covers the inner casing;
   a vacuum insulation panel provided in a space between the inner casing and the outer casing and disposed on at least one surface of the outer casing; and
   a foam material formed by foaming in the space between the inner casing and the outer casing,
   wherein the vacuum insulation panel comprises:
      a core material comprising:
         a first surface attached to the at least one surface of the outer casing,
         a second surface provided opposite the first surface, and
         at least one side surface formed between the first surface and the second surface, and
      an envelope material including:
         a shielding layer,
         a protection layer contacting an outside of the shielding layer,
         a material contact layer contacting an inside of the shielding layer and surrounding the second surface and the at least one side surface to cover the core material, and
         a peripheral portion of the envelope material surrounding all of the second surface and the at least one side surface of the core material and being disposed outside the core material and including a side portion of the envelope material,
   wherein the foam material foams in a space between the vacuum insulation panel and the inner casing to have a thickness of 5 mm to 10 mm, and
   wherein the side portion of the envelope material is provided to have a round-shaped area which covers the at least one side surface of the core material, a convex surface of the round-shaped area faces the core material, and
   wherein the first surface is provided to be larger than the second surface such that the side portion of the envelope material which connects the first surface with the second surface is configured to be in a curved shape which faces the second surface from the first surface.

2. The refrigerator of claim 1, wherein the core material comes into direct contact with the at least one surface of the outer casing without a medium.

3. The refrigerator of claim 1, wherein the peripheral portion of the envelope material, which surrounds all of the second surface of the core material and the at least one side surface to cover the core material and is disposed outside the core material, is attached to the at least one surface of the outer casing.

4. The refrigerator of claim 1, wherein:
   a plurality of such vacuum insulation panels are provided and disposed on a plurality of surfaces which form the outer casing, and
   an auxiliary vacuum insulation panel is provided at a corner formed between the plurality of surfaces of the outer casing.

5. The refrigerator of claim 1, wherein:
   an adhesive layer is provided between the at least one surface of the outer casing and the first surface of the core material, and
   the core material comes into contact with the at least one surface of the outer casing through the adhesive layer.

6. The refrigerator of claim 5, wherein the vacuum insulation panel is disposed in an order of the adhesive layer, the core material, and the envelope material from the outer casing.

7. The refrigerator of claim 5, wherein the peripheral portion of the envelope material, which surrounds all of the second surface and the at least one side surface of the core material and is disposed outside the core material, is attached to the adhesive layer.

8. The refrigerator of claim 7, wherein the envelope material and the adhesive layer comprise identical materials to be heat-welded while the envelope material is attached to the adhesive layer.

9. The refrigerator of claim 1, further comprising:
   a machine compartment which accommodates a compressor;
   a machine compartment cover which covers the machine compartment and comprises a foam solution inlet for allowing a foam solution, which forms the foam material, to foam in the space between the inner casing and the outer casing; and
   a foam solution guide connected to the foam solution inlet to guide the foam solution to the space between the inner casing and the outer casing,
   wherein the foam solution guide extends an initial discharge position of the foam solution by a length of the foam solution guide to an inside of the space between the inner casing and the outer casing.

10. The refrigerator of claim 9, wherein the foam solution guide is provided in a Y shape to allow the foam solution to foam in the space between the outer casing and the inner casing in two ways.

11. The refrigerator of claim 9, wherein:
   one end of the foam solution guide communicates with the foam solution inlet, and another end of the foam solution guide comprises a foam solution outlet through which the foam solution is discharged, and
   a plurality of such foam solution outlets are provided as the foam solution guide diverges in a longitudinal direction.

12. The refrigerator of claim 11, wherein the plurality of foam solution outlets are located between the inner casing and the vacuum insulation panel, and are provided at different positions in a direction between the outer casing and the inner casing.

* * * * *